United States Patent
Kizhnerman

(10) Patent No.: US 7,969,916 B2
(45) Date of Patent: Jun. 28, 2011

(54) SYSTEMS AND METHODS FOR DYNAMIC BRIDGE LINKING

(75) Inventor: M. Sean Kizhnerman, Golden, CO (US)

(73) Assignee: ACT Teleconferencing, Inc., Golden, CO (US)

( * ) Notice: Subject to any disclaimer, the term of this patent is extended or adjusted under 35 U.S.C. 154(b) by 969 days.

(21) Appl. No.: 11/464,878

(22) Filed: Aug. 16, 2006

(65) Prior Publication Data

US 2006/0274675 A1 Dec. 7, 2006

Related U.S. Application Data

(63) Continuation of application No. 10/423,693, filed on Apr. 25, 2003, now Pat. No. 7,119,828, and a continuation-in-part of application No. 10/121,409, filed on Apr. 12, 2002, now Pat. No. 6,967,672.

(60) Provisional application No. 60/375,869, filed on Apr. 26, 2002, provisional application No. 60/283,870, filed on Apr. 13, 2001.

(51) Int. Cl.
*H04L 12/16* (2006.01)
*H04L 12/28* (2006.01)

(52) U.S. Cl. ........................ 370/260; 370/402

(58) Field of Classification Search ............ 370/402, 370/261, 260, 262; 379/202, 205, 207, 220, 379/204, 206
See application file for complete search history.

(56) References Cited

U.S. PATENT DOCUMENTS

| | | | |
|---|---|---|---|
| 5,673,080 A * | 9/1997 | Biggs et al. | 348/14.09 |
| 5,812,652 A * | 9/1998 | Jodoin et al. | 379/205.01 |
| 5,903,632 A | 5/1999 | Brandon | |
| 5,995,608 A * | 11/1999 | Detampel et al. | 379/205.01 |
| 6,404,870 B1 | 6/2002 | Kia et al. | |
| 6,453,030 B1 | 9/2002 | Boutwell et al. | |
| 6,463,414 B1 | 10/2002 | Su et al. | |
| 6,466,550 B1 | 10/2002 | Foster et al. | |
| 6,574,469 B1 | 6/2003 | Xiang et al. | |
| 6,807,563 B1 * | 10/2004 | Christofferson et al. | 709/204 |
| 2001/0005382 A1 | 6/2001 | Cave et al. | |
| 2001/0053132 A1 | 12/2001 | Attimont et al. | |
| 2002/0145999 A1 | 10/2002 | Dzik | |

* cited by examiner

*Primary Examiner* — Melanie Jagannathan
(74) *Attorney, Agent, or Firm* — Merchant & Gould, P.C.

(57) ABSTRACT

Embodiments of the present invention generally relate to systems and methods for implementing telecommunications. More specifically, various embodiments of the present invention provide methods for interconnecting real-time communication links. Such methods include receiving the status of at least two communication links. The communication links may be established between endpoints and bridges in a network. One of the bridges associated with one of the communication links is selected to operate as a host bridge based at least in part on the status of the communication links. Then, after receiving the status from at least two of the communication links, the selected host bridge is automatically caused to initiate another communication link with at least another bridge associated with one of the aforementioned communication links.

16 Claims, 33 Drawing Sheets

Conference List

| Provider | Customer | Department | Subscriber | Month | Year |
|---|---|---|---|---|---|
| ACT Teleconferencing Inc. | ClarionCall Group | Technical | All | | 2005 |

506, 503, 504, 505, 502

| ConfID | Conference Name | Date | Start | End | Subscriber | Callers | Duration | Connected | Billable |
|---|---|---|---|---|---|---|---|---|---|
| 921763 | ClarionCall V 921763 | Feb 24 2005 | 20:40:00 | 20:43:36 | Sean Huber | 3 | 3.60 | 5.48 | 8 |
| 921746 | ClarionCall V 921746 | Feb 23 2005 | 16:50:05 | 16:50:48 | Sean Huber | 1 | 0.72 | 0.72 | 1 |
| 921652 | ClarionCall V 921652 | Feb 16 2005 | 15:20:19 | 15:20:23 | Sean Huber | 1 | 0.07 | 0.07 | 1 |
| 921651 | ClarionCall V 921651 | Feb 16 2005 | 15:19:44 | 15:19:51 | Sean Huber | 1 | 0.12 | 0.12 | 1 |

Provider: ACT Teleconferencing Inc. [First] [Last] [Next] Customer: ClarionCall Group [Print] [Add] [Add Bulk] [Update Bulk] Department: Sales [Download List] Subscriber: All [Search] Month: July Year: 2005

805, 806, 807

Subscriber List

Provider Name: ACT Teleconferencing Inc.   Customer Name: ClarionCall Group   Department: Sales

| Subscriber Name | Host Passcode | Guest Passcode | Company | Account Number | Assigned | Active | Expired |
|---|---|---|---|---|---|---|---|
| Ann Nommensen | 122564 | 536531 | ACT Teleconferencing, Inc. | | Yes | Yes | No |
| Bob Strie | 121297 | 286749 | ACT | | Yes | Yes | No |
| Brandon Warren | 706007 | 373740 | | | Yes | Yes | No |
| David Gladding | 223528 | 598493 | | | Yes | Yes | No |
| New Subscriber | 283669 | 413615 | | | No | No | No |
| New Subscriber | 357525 | 965127 | | | No | No | No |
| New Subscriber | 385990 | 383207 | | | No | No | No |
| New Subscriber | 405952 | 738997 | | | No | No | No |
| New Subscriber | 452560 | 108575 | | | No | No | No |
| New Subscriber | 500167 | 282003 | | | No | No | No |
| New Subscriber | 508848 | 862473 | | | No | No | No |
| New Subscriber | 643073 | 279967 | | | No | No | No |
| New Subscriber | 677027 | 624250 | | | No | No | No |
| New Subscriber | 719507 | 889252 | | | No | No | No |
| New Subscriber | 722569 | 292425 | | | No | No | No |
| New Subscriber | 729596 | 566594 | | | No | No | No |
| New Subscriber | 754263 | 878283 | | | No | No | No |
| New Subscriber | 767690 | 533363 | | | No | No | No |
| New Subscriber | 867823 | 555014 | | | No | No | No |
| New Subscriber | 896036 | 342038 | | | No | No | No |

[First] [Last] (2) [Print] [Add] [Add Bulk] [Next]

801

Sean Huber's Web Settings

[Edit]

| User Name | sean |
|---|---|
| Full Name | Sean Huber |
| eMail Address | |
| Password | ••••• |
| Records per Page | 20 |
| List Subscriber by | Subscriber |
| Display Provider Name | Yes |
| Time Zone | Mountain Standard Time |

Web Access

| User Level | Customer Service Manager |
|---|---|
| Provider Name | ALL |
| Customer Name | ALL |
| Department Name | ALL |
| Subscriber | ALL |

[Edit]

| | Provider | Customer | Department | Subscriber | Month | Year |
|---|---|---|---|---|---|---|
| | ACT Teleconferencing Inc. ▼ | ClarionCall Group ▼ | Sales ▼ | All ▼ | July ▼ | 2005 ▼ |

Save  Cancel

Customer Info

| | |
|---|---|
| Active | ○No ⊙Yes |
| Provider Name | ACT Teleconferencing Inc. |
| Customer Name | ClarionCall Group |
| Address1 | |
| Address2 | |
| City | |
| State | |
| Country | |
| Postal Code | |
| Main Contact | Sean Huber |
| Phone Number | 303-205-7309 |
| Fax Number | 303-238-0096 |
| Account Number | |
| Max Number of Subscribers | 2000 |
| Default Bridge | ClarionCall v ▼ |

| Provider | | Customer | | Department | | Subscriber | | Month | | Year | |
|---|---|---|---|---|---|---|---|---|---|---|---|
| ACT Teleconferencing Inc. ▼ | | ClarionCall Group ▼ | | Technical ▼ | | ALL ▼ | | July ▼ | | 2005 ▼ | |
| (Save) (Cancel) | | | | | | | | | | | |

Subscriber Info

| Assigned | ⊙ No ○ Yes |
|---|---|
| Active | ⊙ No ○ Yes |
| Provider Name | ACT Teleconferencing Inc. |
| Customer Name | ClarionCall Group |
| Department Name | Technical |
| Host Passcode | 834339  [Generate] |
| Guest Passcode | 162269  [Generate] |
| Subscriber Name | |
| Phone Number | |
| Fax Number | |
| Email | |
| Company Name | |
| Account Number | |
| Passcode Expiration Date | ☑ Never Expires |

New Conference Profile

| Host Talk Mode | ○ Monitor ⊙ Talk/Listen | Guest Talk Mode | ○ Monitor ⊙ Talk/Listen |
|---|---|---|---|
| Host Entrance Tone | ○ No ⊙ Yes | Guest Entrance Tone | ○ No ⊙ Yes |
| Host Exit Tone | ○ No ⊙ Yes | Guest Exit Tone | ○ No ⊙ Yes |

| Provider | Customer | Department | Subscriber | Month | Year |
|---|---|---|---|---|---|
| ACT Teleconferencing Inc. ▶ | ClarionCall Group ▶ | Technical ▶ | ALL ▶ | July ▶ | 2005 ▶ |

(Save) (Cancel)

☑ Never Expires

Create Bulk Subscribers

| | |
|---|---|
| Provider Name | ACT Teleconferencing Inc. |
| Customer Name | ClarionCall Group |
| Department Name | Technical |
| Starting Passcode | 100000 |
| Ending Passcode | 999999 |
| Quantity (81 max) | 100 |
| Distribution | ⊙ Random ○ Sequential ○ Random Pairs |
| Passcode Expiration Date | |
| Default Subscriber Name | New Subscriber |
| Max Participants per Conferences | 25 |
| Max Minutes per Conferences | 120 |
| Total Conference Limit | 0  ☑ No Limit |
| Total Conferences Time Limits | 0  ☑ No Limit |

(Create) (Cancel)

ClarionCall
BY ACT TELECONFERENCING

Provider: ACT Teleconferencing Inc. ▼  Customer: ClarionCall Group ▼  Department: Technical ▼  Subscriber: Gene T. Horton ▼  Month: July ▼  Year: 2005 ▼

(Add) (Edit) (Print) (Add Bulk) (Update Bulk) (Download List)  (Passcode Troubleshooter)

Subscriber Info

| | |
|---|---|
| Assigned | Yes |
| Active | No |
| Provider Name | ACT Teleconferencing Inc |
| Customer Name | ClarionCall Group |
| Department Name | Technical |
| Host Passcode | 212121 |
| Guest Passcode | 196521 |
| Subscriber Name | Gene T. Horton |
| Phone Number | |
| Fax Number | |
| Email | |
| Company Name | |
| Account Number | |
| Passcode Expiration Date | Mar 26 2005 |
| Created On | Sun Dec 30 00:42:01 UTC 2001 |

☐ http://www.clarioncall.com-Passcode Troubleshooter - Mic... ☐ ☒

[Close]

This Passcode is not working because:

1. This subscriber is not active. Please contact Technical customer service to activate this Passcode.

2. This Passcode expired on Mar 28 2005 Please contact Technical customer service to extend expiration date of this Passcode.

☐ Done                                    ○ internet

| Provider | Customer | Department | Subscriber | Month | Year |
|---|---|---|---|---|---|
| ACT Teleconferencing Inc. ▾ | demo 3-a ▾ | demo 3 ▾ | ALL ▾ | July ▾ | 2005 ▾ |

[First] [Last] [Print] [Add] [Add Bulk] [Update Bulk] [Download List] [Search]

Subscriber List

Provider Name: ACT Teleconferencing Inc.   Customer Name: demo 3   Department: demo 3-a

| Subscriber Name | Host Passcode | Guest Passcode | Company | Account Number | Assigned | Active | Expired |
|---|---|---|---|---|---|---|---|
| 3232 | 130072 | 419143 | | | No | No | No |
| 32323 | 207398 | 207693 | sdfsdf | | No | No | No |
| Ben Macri | 268570 | 333090 | | | Yes | Yes | No |

1  [Print] [Add] [Add Bulk]

[First] [Last]

Provider: ACT Teleconferencing Inc. | Customer: ALL | Department: ALL | Subscriber: ALL | Month: July | Year: 2005

[Show List] [Edit] [Print]

Conference Details for Conference 922066

| | |
|---|---|
| Billable | Yes |
| Conference ID | 922066 |
| Conference Name | ClarionCall v 922066 |
| Billing Reference | |
| Host Subscriber | Sean Huber |
| Conference Date | Jul 13 2005 |
| Conference Start | 16:09:33 |
| Conference End | 16:48:21 |
| Duration | 38.80 |
| Connected Minutes | 76.62 |
| Billable Minutes | 79 |
| Participants | 2 |

Participants

| Host | Dial Out | Port | Phone | Name | Connect Time | Disconnect Time | Connected | Billable |
|---|---|---|---|---|---|---|---|---|
| x | | 130 | 2200- | Host | 16:09:33 | 16:48:21 | 36.80 | 40 |
| x | | 202 | 2200- | Host | 16:10:33 | 16:48:19 | 37.82 | 39 |

~1601

[Show List] [Edit] [Print]

ClarionCall
BY ACT TELECONFERENCING

Provider: ACT Teleconferencing Inc. ▼  Customer: ALL ▼  Department: ALL ▼  Subscriber: ALL ▼  Month: July ▼  Year: 2005 ▼

(Show List) (Edit) (Rebuild Model)

Provider Pricing Model

| Level | Minutes From | Minutes To | Rate |
|---|---|---|---|
| 1 | 0 | 1000000 | $0.12 |
| 2 | 1000001 | 2000000 | $0.11 |
| 3 | 2000001 | 3000000 | $0.10 |
| 4 | 3000001 | 4000000 | $0.09 |
| 5 | 4000001 | 5000000 | $0.08 |
| 6 | 5000001 | | $0.07 |

(Show List) (Edit)

| Provider | | | Customer | | Department | Subscriber | Month | Year |
|---|---|---|---|---|---|---|---|---|
| ACT Teleconferencing Inc. ▼ | | | ALL ▼ | | ALL ▼ | ALL ▼ | April ▼ | 2003 ▼ |
| (First) (Last) (Prior) (Next) | ① ③ | (Print) | (Show Only Open Invoices) | | | | | |

Invoice List

Provider Name: ACT Teleconferencing Inc.

| Invoice Number | Status | Invoice Date | Month | Year | Description | Minutes | Total |
|---|---|---|---|---|---|---|---|
| 30222 | CLOSED | Nov 27 2003 | Nov | 2003 | | 401 | $57.43 |
| 30219 | CLOSED | Nov 3 2003 | Oct | 2003 | | 372 | $80.22 |
| 30214 | CLOSED | Oct 3 2003 | Sep | 2003 | | 670 | $124.34 |
| 30210 | CLOSED | Sep 10 2003 | Aug | 2003 | | 388 | $84.81 |
| 30204 | CLOSED | Oct 3 2003 | Jul | 2003 | | 1046 | $228.20 |
| 30199 | CLOSED | Jul 7 2003 | Jun | 2003 | | 374 | $81.62 |
| 30191 | CLOSED | Jun 9 2003 | May | 2003 | | 763 | $167.37 |
| 30180 | CLOSED | May 15 2003 | Apr | 2003 | | 244 | $53.31 |
| 30181 | CLOSED | Mar 29 2003 | Mar | 2003 | | 1273 | $240.58 |
| 30174 | CLOSED | Mar 14 2003 | Feb | 2003 | | 606 | $132.97 |
| 30167 | CLOSED | Mar 13 2003 | Jan | 2003 | | 444 | $97.03 |
| 30161 | CLOSED | Jan 27 2003 | Dec | 2002 | | 958 | $209.06 |
| 30156 | CLOSED | Dec 19 2002 | Nov | 2002 | | 1101 | $240.56 |
| 30150 | CLOSED | Oct 30 2002 | Oct | 2002 | | 959 | $216.06 |
| 30142 | CLOSED | Sep 30 2002 | Sep | 2002 | | 3423 | $751.40 |
| 30136 | CLOSED | Sep 10 2002 | Aug | 2002 | | 1130 | $249.02 |
| 30128 | CLOSED | July 31 2002 | Jul | 2002 | | 1768 | $363.08 |
| 30121 | CLOSED | Jun 28 2002 | Jun | 2002 | | 3435 | $613.28 |
| 30115 | CLOSED | May 31 2002 | May | 2002 | | 5467 | $992.22 |
| 30108 | CLOSED | Apr 30 2002 | Apr | 2002 | | 2941 | $541.83 |

(First) (Last) (Prior) (Next) Page ① ③ (Print) (Show Only Open Invoices)

Provider: ACT Teleconferencing Inc. ▼  — 2105
[Show List] [Edit] [Print] [Summary] [Details] [Generate] [Close Out]

| Customer | Department | Subscriber | Month | Year |
|---|---|---|---|---|
| ALL ▼ | ALL ▼ | ALL ▼ | April ▼ | 2003 ▼ |

Invoice (Totals Mode)

| Provider ID | ACT001 |
|---|---|
| Provider Name | ACT Teleconference Inc. |
| Invoice Number | 30310 |
| Invoice Status | OPEN |
| Invoice Creation Date | Jun 29 2005 |
| Invoice Month | Jun |
| Invoice Year | 2005 |
| Billing Start Date | Jun 1 2005 |
| Description | |

Invoice Charges

| | Minutes | Charge |
|---|---|---|
| Conferencing | 124 | $19.84 |
| Dialout | 50 | $2.79 |
| Surcharge | | $4.44 |
| Invoice Total | | $27.07 |

Invoice Items

| Subscriber Name | Host Passcode | Guest Passcode | Company | Account Number | Confs | Charge |
|---|---|---|---|---|---|---|
| Sean Test 4 | 481123 | 947620 | | | 17 | $27.07 |
| Department Total | | | | | 17 | $27.07 |

— 2101

Invoice

| Provider ID | ACT001 |
|---|---|
| Name | ACT Teleconferencing Inc. |
| Address | 1526 Cole Blvd |
| | Suite 300 |
| | Golden, CO 80401 |
| | USA |

| Invoice Number | 30308 |
|---|---|
| Invoice Date | May 31 2005 |
| Invoice Period | May 2005 |
| Billing Start | May 1 2005 |
| Credit Terms | Net 30 |

Reference  Acct 1234567890

Invoice Total  $33.18

Usage By Customer

| Customer Name | Conferences | Conferences | Charge |
|---|---|---|---|
| ClarionCall Group | 20 | 152 | |
| Invoice Totals | 20 | 152 | $33.18 |

---

ACT Teleconferencing Services, Inc.

Client ID: ACT001

Bill To:
ACT001
ACT Teleconferencing Inc.
1526 Cole Blvd
Suite 300
Golden, CO 80401
USA Mail Instructions:
ACT Teleconferencing Services, Inc.
Dept CH 17366
Palatine, IL 60055-7366

Wire Instructions:
Beneficiary Bank: Silicon Valley Bank, Santa Clara
Bank Address: 3003 Tasman Drive
Santa Clara, CA 95054
FRB SF ABA#: 121140399
Account Number: 3300445032
Beneficiary Reference: ACT Teleconferencing Services, Inc.
Swift Code: 121140399

Invoice Number: 30308
Invoice Date: May 31 2005
Billing Period Start: May 1 2005
Billing Period End: May 31 2005
Due Date: NET 30
Invoice Amounts: $33.18

Amount Enclosed:  ~2201

FIG. 22

| Destination / Origination | LON | DEN | SYD |
|---|---|---|---|
| LON |  | 10.20.30.60 | 10.20.30.50 |
| DEN | 10.20.30.40 |  | 10.20.30.50 |
| SYD | 10.20.30.60 | 10.20.30.40 |  |

SYSTEMS AND METHODS FOR DYNAMIC BRIDGE LINKING

The present application is a continuation in part of U.S. patent application Ser. No. 10/423,693, entitled "System and Method for Establishing and Controlling an On-Demand Teleconference by a Remote Computer", and filed Apr. 25, 2003 now U.S. Pat. No. 7,119,828, by Huber et al. which claims the benefit of U.S. Provisional Patent Application No. 60/375,869 filed Apr. 26, 2002 and is a continuation in part of U.S. patent application Ser. No. 10/121,409, entitled "System and Method for Establishing and Controlling an On-Demand Teleconference by a Remote Computer", and filed by Apr. 12, 2005, now U.S. Pat. No. 6,967,672, Huber which claims the benefit of U.S. Provisional Patent Application No. 60/283,870 filed Apr. 13, 2001. Each of the aforementioned patent applications is incorporated herein by reference in its entirety.

BACKGROUND

Embodiments of the present invention generally relate to systems and methods for implementing telecommunications. More specifically, embodiments of the present invention relate to systems and methods for dynamically linking telecommunication bridges.

Existing teleconferencing systems are capable of establishing a telephone conference call or teleconference between multiple individuals. One of the most common methods for establishing a teleconference involves a teleconference host or sponsor (i.e., the individual who desires to have a teleconference), to schedule the teleconference with a human teleconference operator in advance of the teleconference. The operator typically initiates a software application such as, Windows™ Operating Console that provides control of all calls occurring on a particular bridge. Using the software, the operator opens a pre-loaded instance of the call, and the necessary link line(s) for the proposed conference call are preconfigured in a table detailing the proposed call. At a pre-determined point in time, the operator dials to a second bridge, waits for the system or another operator to answer the call, and then manually links the calls by clicking an input on the operator's user screen. As will be appreciated, the aforementioned approach may be labor intensive, may not provide an ability to link calls on demand, and may involve various charges incurred while a call is pre-setup but not currently being utilized by callers.

Thus, for at least one or more of the aforementioned reasons, a need exists for advanced systems and methods for implementing telecommunication connections.

SUMMARY OF THE INVENTION

Embodiments of the present invention generally relate to systems and methods for implementing telecommunications. More specifically, embodiments of the present invention relate to system and methods for dynamically linking telecommunication bridges.

Various embodiments of the present invention provide methods for interconnecting real-time communication links. Such methods include receiving the status of at least two communication links. The communication links may be established between endpoints and bridges in a network. One of the bridges associated with one of the communication links is selected to operate as a host bridge based at least in part on the status of the communication links. Then, after receiving the status from at least two of the communication links, the selected host bridge is automatically caused to initiate another communication link with at least another bridge associated with one of the aforementioned communication links. In some cases, selecting the host bridge includes consideration of whether the first status indicates a host status, and/or whether the second status indicates the host status. In other cases, selecting the host bridge includes consideration of whether one or more of the bridges associated with the various communication links has sufficient available capacity. In yet other cases, selecting the host bridge is based at least in part on the determination of whether one or more of the bridges associated with the communication links is least cost routable.

In various instances of the aforementioned embodiments, the methods further include recording respective entries in a database table that includes one or more call parameters related to a particular one of the communication links. In some cases, the call parameters include one or more of the following: a bridge identifier, a call status, a port number, a conference passcode, and a bridge status. Further, in some cases, the status associated with the communication links is obtained by polling the database table. In some instances of the aforementioned embodiments, automatically causing the selected bridge to initiate a communication link to another bridge includes monitoring a database populated with a plurality of communication link status information to identify when the first communication link and the second communication link have been established. In some cases, initiating the communication link between the host bridge and another bridge includes: determining an access property of the non-host bridge; communicating with the non-host bridge using the access property; and transmitting a validation code from the non-host bridge to the host bridge. In one or more cases, the validation code is a guest passcode.

Other embodiments of the present invention provide a computer-readable storage medium containing a set of instructions capable of causing one or more processors to: receive a first status associated with a first communication link that is established between a first endpoint and a first bridge in a network; receive a second status associated with a second communication link, that is established between a second endpoint and a second bridge in the network; select one of the first bridge and the second bridge to operate as a host bridge; and cause the selected bridge to initiate a third communication link with the non-selected one of the first bridge and the second bridge after receiving both the first status and the second status. Selection of one of the first bridge and the second bridge to operate as a host bridge is based at least in part on the first status and the second status.

Yet other embodiments of the present invention provide methods for interconnecting real-time communication links. Such methods include receiving a first status associated with a first communication link and a second status associated with a second communication link. The first communication link is established between a first endpoint and a first bridge in a network and the first status includes information related to the first communication link. Similarly, the second communication link may be established between a second endpoint and a second bridge in the network. The methods further include determining if the first bridge is a host bridge based at least in part on the first status. In addition, the first bridge is dynamically linked to the second bridge based at least in part on the first status and the second status. In this configuration, the first bridge acts as a host bridge for a multi-party communication ongoing between at least the first endpoint and the second endpoint.

In some cases, the aforementioned method further includes determining that the second bridge is the host bridge based at least in part on the second status; receiving a third status associated with a third communication link that is established between a third endpoint and a third bridge in the network; and dynamically linking the third communication link to the first communication link and the second communication link by creating a fourth communication link between the host bridge and the third bridge. In some cases, determining the host bridge based at least in part on the first status includes determining if a call passcode associated with the first communication link is a host passcode or a guest passcode.

This summary provides only a general outline of some embodiments of the present invention. Many other objects, features, advantages and other embodiments of the present invention will become more fully apparent from the following detailed description, the appended claims and the accompanying drawings.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 depicts a conference list web page constructed in accordance with the present invention;

FIG. 6 depicts the bridge status web page constructed in accordance with the present invention;

FIG. 7 depicts the customer viewing web page constructed in accordance with the present invention;

FIG. 8 depicts the user web page constructed in accordance with the present invention;

FIG. 9 depicts the customization web page constructed in accordance with the present invention;

FIG. 10 depicts the new customer web page constructed in accordance with the present invention;

FIG. 11 depicts the new department web page constructed in accordance with the present invention;

FIG. 12 depicts the new subscriber web page constructed in accordance with the present invention;

FIG. 13 depicts the bulk subscriber web page constructed in accordance with the present invention;

FIG. 14 depicts the passcode troubleshooting web page constructed in accordance with the present invention;

FIG. 15 depicts the subscriber status web page used in accordance with the present invention;

FIG. 16 depicts a conference detail web page constructed in accordance with the present invention;

FIG. 17 depicts the traffic feed web page constructed in accordance with the present invention;

FIG. 18 depicts the pricing model display web page constructed in accordance with the present invention;

FIG. 19 depicts the pricing model entry web page constructed in accordance with the present invention;

FIG. 20 depicts the invoice list web page constructed in accordance with the present invention;

FIG. 21 depicts the totals mode invoice display web page constructed in accordance with the present invention;

FIG. 22 depicts the printable invoice display web page constructed in accordance with the present invention;

FIG. 33 illustrates an exemplary table containing IP dial-string which may be used in accordance with one or more embodiments of the present invention.

DETAILED DESCRIPTION

Figure 1:
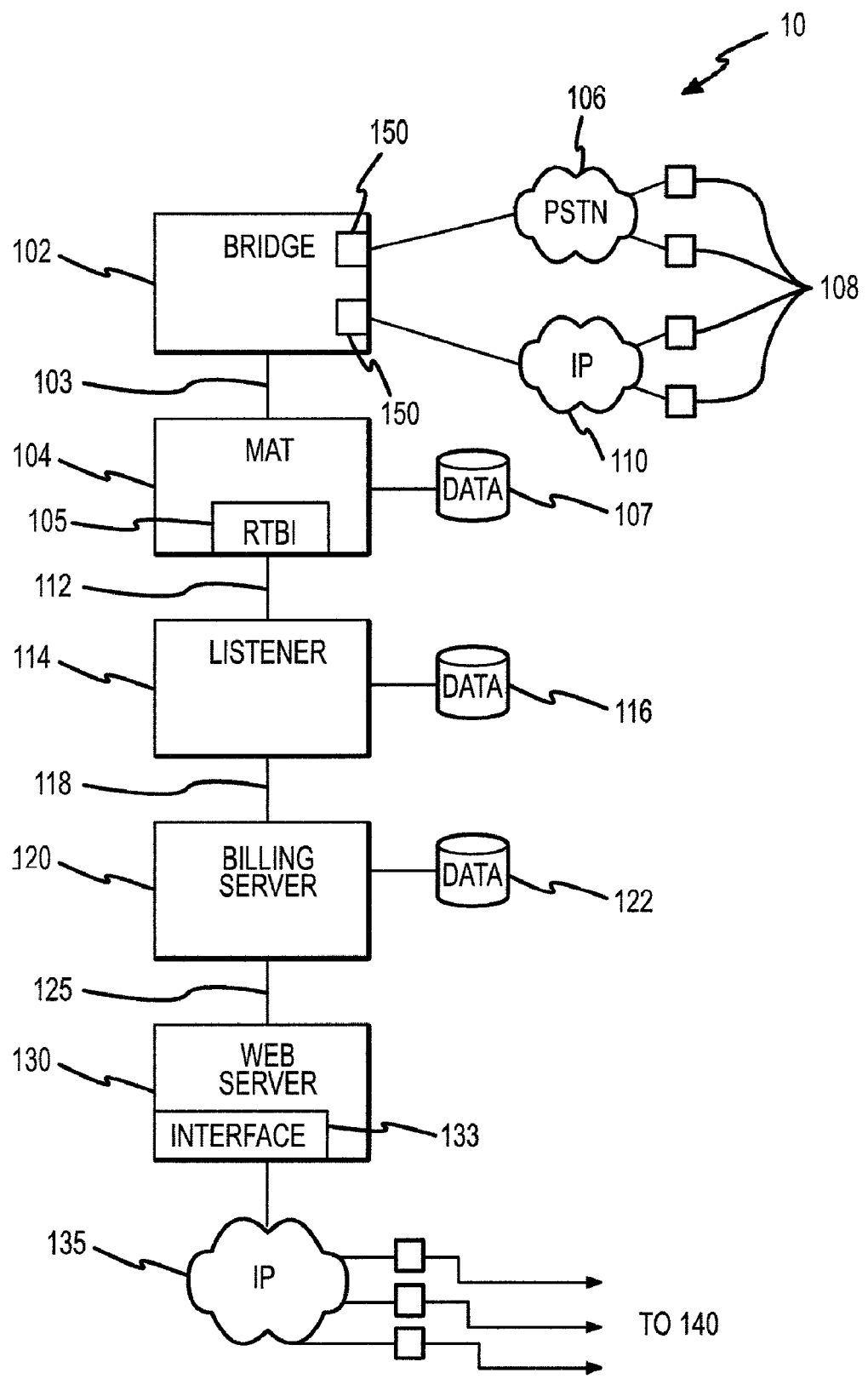
FIG. 1 is a block diagram of one embodiment of the present invention.

Embodiments of the present invention generally relate to systems and methods for implementing telecommunications. More specifically, embodiments of the present invention relate to system and methods for dynamically linking telecommunication bridges.

In accordance with various embodiments of the present invention, systems and methods for performing Dynamic Bridge Linking (DBL) are described. For example, a method for DBL is described for automatically linking bridges without the use of manual operator intervention. According to one embodiment, a bridge coordinator monitors the bridges in a teleconferencing system. The bridge coordinator may be a separate system which is configured to recognize when multiple bridges should be linked to effectuate a desired telecommunication. According to one embodiment of the present invention, when the bridge coordinator determines that multiple bridges need to be linked, the bridge coordinator automatically launches a dial-out process. Further, in some embodiments of the present invention, the bridge coordinator is capable of determining the least expensive dialing option, such as PSTN, VOIP, and/or the like.

As an operational example, caller A may dial into one bridge while later caller B may dial into a second bridge each intending to be connected to the same teleconference. Since each bridge may operate independent of the other, it may be that neither bridge recognizes that the conference is already in progress. In some embodiments, the bridge coordinator may be or may include a software program that monitors the activity of a number of bridges within a network. When the bridge coordinator recognizes that caller A and caller B should be on the same conference call, the bridge coordinator can designate one of the bridges (or another bridge altogether) to operate as a host bridge. The host bridge may initiate a dial out to other bridges servicing communication links that are to be included on the same conference call including the communication link servicing caller B. The process may be repeated until all callers are properly connected.

One or more benefits may be provided as a result of various embodiments of the present invention. For example, various embodiments of the present invention may reduce interaction with a live operator, and/or may reduce time spent idling as communication links are dynamically formed rather than statically formed. As used herein, the term "dynamically" is used in its broadest sense to mean the formation of a link at a point in time when the link comes into active use by two or more participants in a communication session. In contrast, a "statically" formed link is generally set-up in anticipation of a particular communication session, and typically before more than one participant has joined the communication session. In contrast to dynamically linking bridges, the traditional, operator-assisted method involves establishing links in anticipation of a communication session. This may incur long-distance charges even before the advent of the communication session. Using one or more embodiments of the DBL method can provide the establishment of communication links as they are needed, thus minimizing the costs of any toll services. In addition, in the embodiments of the present invention that provide for automatic set-up and linking, there is a reduced need to employ operators. As yet another advantage found in some embodiments of the present invention, users may be able to dynamically link to a communication session by dialing in to bridges local to the particular users, rather than being required to dial in to a predetermined bridge that may not be local to one or more of the users.

Yet another benefit found in one or more embodiments of the present invention is that of bridge scalability. For example, if a call exceeds the capacity of a bridge, additional bridges may be employed on an as-needed basis. The bridges will recognize when a link needs to be established and establish the link automatically. Based on the disclosure provided herein, one of ordinary skill in the art will recognize that one or more of the aforementioned advantages, and/or some other advantages are found in the various embodiments of the present invention described herein.

Embodiments of the present invention may be provided as a computer program product which may include a computer readable medium having stored thereon instructions which may be executed by a computer (or other electronic devices) to perform a process. Based on the disclosure provided herein, one of ordinary skill in the art will recognize a variety of computer readable media that may be used in relation to various embodiments of the present invention. As just some examples, the computer readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, and/or combinations thereof. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modern communication networks. Importantly, while these embodiments describe various aspects of the invention in relation to modern communication networks and computer programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks, PSTN networks, VOIP networks, IP networks, video conferencing, and the like. In addition, embodiments are applicable to all levels of communications from the local community communications to world wide communication systems.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed therebetween, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

FIG. 1 shows a block diagram of a system 10 for establishing and controlling an on-demand teleconference on a bridge 102 by one or more remote computers 140. Teleconference bridge 102 is connected via connection 103 to a maintenance and administrative terminal ("MAT") 104 and via a plurality of ports 150 on bridge 102 to telephones 108 via the conventional Public Switched Telephone Network ("PSTN") 106. Optionally, bridge 102 may be connected via a plurality of ports 150 on bridge 102 to telephones 108 via an IP connection 110.

In the preferred embodiment, a high speed serial connection is used for connection 103. Those skilled in the art will recognize, however, that an Ethernet, parallel or other connection could be used for connection 103.

Bridge 102 is preferably a CONTEX 240 teleconferencing bridge manufactured by Compunetix, Inc. of Monroeville, Pa. having 240 or more ports. Bridge 102 provides various digital signal processing, conferencing, call flow, and other conference-related functionality that allows several individuals to participate in a telephone conference call and allows several conference calls to be in progress at any given time. Those skilled in the art will recognize that other teleconferencing bridges providing similar functionality may also be used, with departing from the spirit and scope of the present invention.

Bridge 102 is managed and controlled by MAT 104, which is implemented as software residing on a workstation or other processing platform. MAT 104 is connected to a small database 107 and executes a real-time billing interface 105, which is an application programming interface (API). As discussed in greater detail below, billing interface 105 allows information to be sent and received by MAT 104.

In the preferred embodiment, MAT 104 and billing interface 105 are a workstation or other processing platform that executes version 1.0 or higher of the Real-Time Bridge Interface which is also sold by Compunetix.

Figure 2:
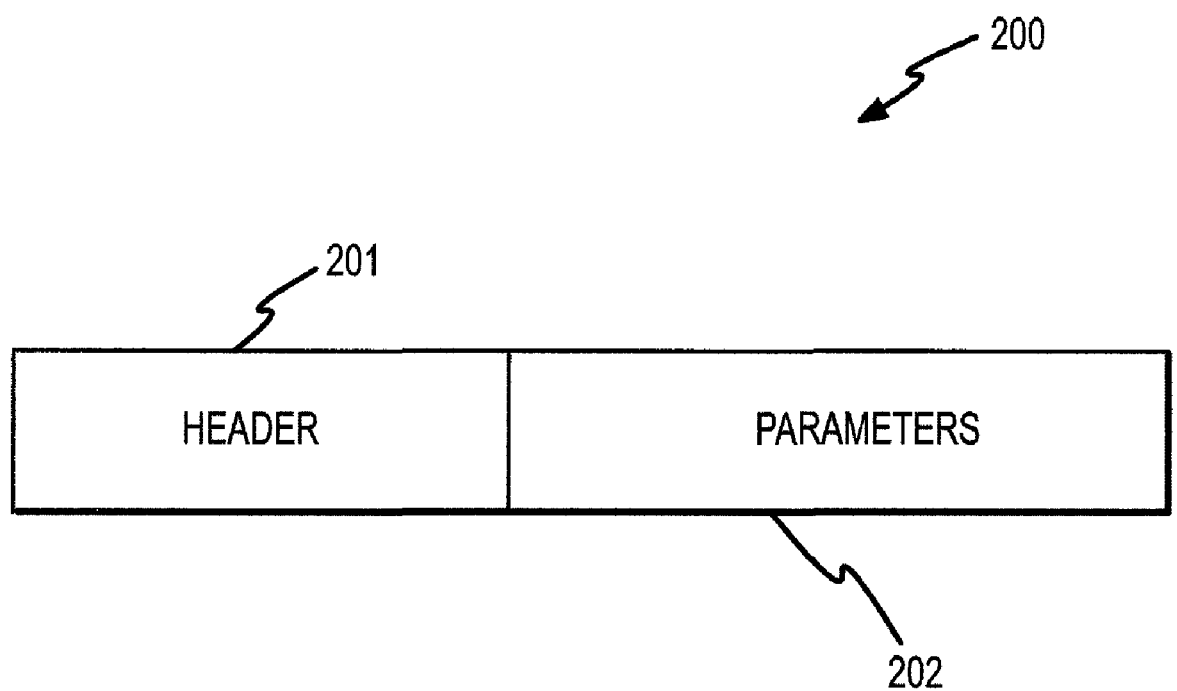
FIG. 2 depicts the format of a transaction record used by the present invention.

Referring to FIG. 1 and FIG. 2, those skilled in the art will recognize that the billing interface 105 of MAT 104 creates a transaction record 200 whenever certain activities occur on bridge 102. Each transaction record 200 is temporarily stored in database 107.

FIG. 2 shows the general format of a transaction record 200. Specifically, transaction record 200 comprises header information 201 and one or more parameters 202.

Header 201 contains information for generally categorizing transaction record 200. For example, header information 201 may indicated that transaction record 200: (1) is an inquiry as to the validity of a certain host or guest passcode, (2) is a response to a validity request indicating whether a host or guest passcode is valid or invalid, (3) contains information concerning the attributes associated with a particular passcode, (4) indicates a change to the status of a port 150 located on bridge 102, (5) is an inquiry concerning the number of stored transaction records 200 in a particular device, (6) an inquiry concerning a specific transaction record 200, (7) is intended to indicate the start time or end time of a particular conference, or (8) is intended to change user data.

One or more parameters 202 may be used within transaction record 200. Parameters 202 are the elements that actually transmits the data within a transaction record 200. Representative parameters 202 are shown in Table 1.

TABLE 1

| Parameter | Description |
| --- | --- |
| Port | Port 150 of bridge 102 from which the passcode was entered |
| Host Passcode | Passcode associated with host. |
| Guest Passcode | Passcode associated with guest. |
| Scheduled Date | Date for which the conference is scheduled |
| Scheduled Time | Time for which the conference is scheduled |
| Scheduled Duration | Scheduled duration of the conference |
| Conference Type | The type of conference call |
| Conference Name | Name associated with conference. |
| Conference Code | Billing code associated with the conference. |
| Scheduled Number Of Parties | Scheduled number of parties for a particular conference. |
| Connect Time Limit | Total prepaid connect time left for this code set. |

For a given conference call there might be 20 or more transaction records 200 produced by billing interface 105, for actions such as: connecting to the bridge, requesting a passcode, entering the conference, hanging up, and the act of the conference being terminated, or torn down. For example, if a teleconference attendee hangs up a phone 108 connected to bridge 102, billing interface 105 will generate a transaction record 200 in which header 201 will contain information identifying that the transaction is intended to convey a change in the status of one of the ports 150 of bridge 102. Parameters 202 will contain information concerning the actual action that has occurred (i.e., a disconnect), the specific port 150 experiencing the status change, and the time the status changed occurred.

Referring again to FIG. 1, billing interface 105 sends a copy of any new transaction records 200 generated by bridge 102, via a connection 112, to a listener 114. In the preferred embodiment connection 112 is an IP connection connected to a TCP port (not shown) on Listener 114.

Listener 114 collects each transaction record 200, checks each for internal data errors, and places the transaction record 200 in a database 116. In the preferred embodiment, Listener 114, is implemented as software residing on a workstation or other processing platform and continuously screens a pre-specified port on the MAT 104 (by default TCP/IP Port 7300) for any new incoming data. Those skilled in the art will recognize that for particular applications, Listener 114 can be programmed to convert transaction record 200 to a more efficient structure or discard unneeded data in transaction record 200, thereby allowing more information to be stored.

When system 10 is initially started, billing interface 105 on MAT 104 and Listener 114 exchange 'handshaking' information (such as transmission speeds) with each other, ensuring that both systems are operating properly and recognize each other. MAT 104 and Listener 114 begin to exchange data, once the devices have established a communication session.

MAT 104 and Listener 114 continue to communicate to ensure that all the transaction records generated by bridge 102 are actually received and stored by Listener 114 in database 116. In the preferred embodiment, MAT 104 and Listener 114 will, every 10 minutes, attempt to verify the contents of databases 107 and 116 by comparing the number of transaction records 200 stored in the databases 107 and 116. If the number of transaction records 200 stored in the database 107 and 116 does not match, a resynchronization operation will begin.

During a resynchronization operation, Listener 114 will request MAT 104 to re-send all the transaction records 200 stored in database 107 and compare the newly received transaction records 200 to those stored in the database 116 of Listener 114. If Listener 114 identifies any new transaction records 200 that have not been previously stored in database 116, it will place the new transaction records 200 in database 116. Checksums are used to ensure that data is not corrupted.

After the resynchronization operation has occurred, MAT 104 and Listener 114 will attempt to re-verify the contents of databases 107 and 116 by comparing the number of transaction records 200 stored in the databases 107 and 116.

Because Listener 114 only receives and process transaction records 200 it doesn't know how a participant is connected to bridge 102 (e.g., via PSTN 106 or IP connection 110). Therefore, Listener 114 operates regardless of how an attendee is connected to Bridge 102. If different billing types are required for connections via PSTN 106 or IP 110, DNIS information can be used and analyzed as part of the billing process.

The transaction records stored in database 116 of Listener 114 are also replicated and sent to a database 122 connected to a billing server 120 via connection 118. In the preferred embodiment, billing server 120 is implemented as software residing on a workstation or other processing platform. As will be discussed in greater detail below, billing server 120 processes transaction records 200 by applying various billing rules established by users. Once the transaction records 200 are processed by billing server 120, the information can be passed to web server 130 through standard SQL ADO (ActiveX Data Object) drivers. As will be discussed in greater detail below, this enables a user to directly view the call transaction records, or summaries thereof.

A web server 130 is also connected to billing server 120 via connection 125. In the preferred embodiment, web server 130 is implemented as software residing on a workstation or other processing platform and executes a web interface 133. Web server 130 is connected via web interface 133 to the internet 135 and ultimately to remote computers 140.

A user ID and password are issued to each individual authorized to access web interface 133. The user ID and password used to access web interface 133 are separate and distinct from the host and guest passcodes used to access bridge 102. By accessing web interface 133, teleconference hosts can establish teleconferences without the need of a human operator and perform a variety of administrative functions.

When a user activates, or deactivates, a host or guest passcode using web interface 133, the information is sent to billing server 120 which transmits (replicates) the data to databases 107, 116 and 122. When a host or guest passcode is presented to bridge 102 via a telephone 108, bridge 102 can determine if the host or guest passcode is valid by having MAT 104 compare the received passcode to the valid passcodes stored in database 107. If the passcode is valid, MAT 104 instructs bridge 102 to place that call into conference.

Figure 3:
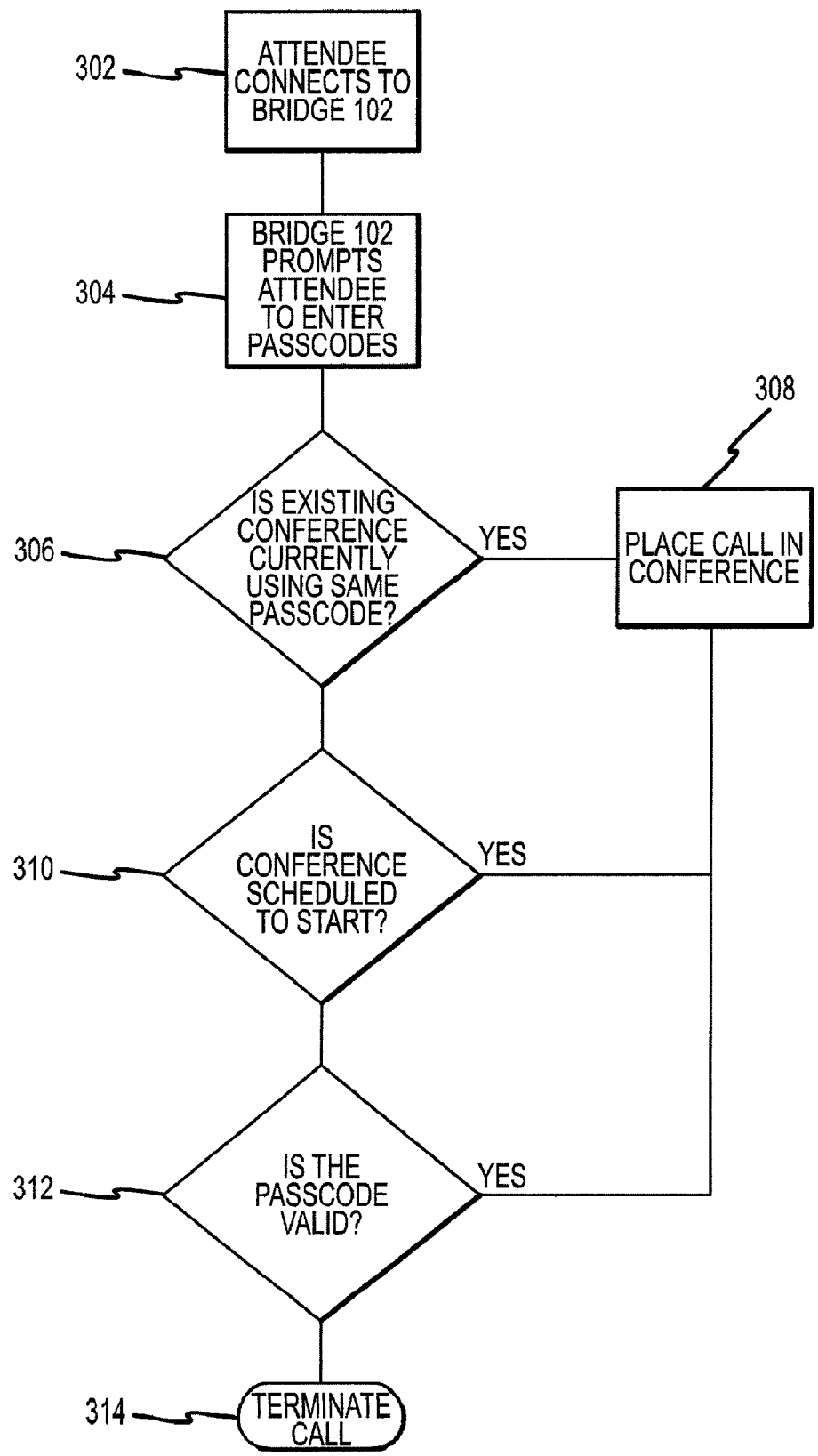
FIG. 3 depicts the process used to connect a caller to a conference call.

FIG. 3 describes in greater detail the process used by a teleconference attendee to be placed into a conference call. As shown in step 302, the attendee using a telephone 108 connects to bridge 102 via PSTN 106 or IP connection 110. As shown in step 304, upon connecting, bridge 102 prompts the attendee to enter a guest or host passcode. At step 306, bridge 102 has MAT 104 search database 107 to determine whether the passcode entered by the attendee matches the passcode to a conference call currently in progress on bridge 102. If the entered passcode matches the passcode of a conference already in progress, the attendee is placed into that conference at step 308. If the passcode does not match the passcode associated with a conference currently in progress, referring to step 310, bridge 102 has MAT 104 search database 107 to determine whether the passcode entered by the attendee matches the passcode associated with a conference that is scheduled to start around the time of the attendee's call. If the entered passcode matches the passcode of a conference that is scheduled to start around the time of the attendee's call, the attendee is placed into that conference at step 308. If the entered passcode does not match the passcode of a conference that is scheduled to start around the time of the attendee's call, referring to step 312, bridge 102 issues a query to database 116 attached to listener 114 to determine whether the entered passcode is a valid passcode. If the entered passcode is a valid passcode, bridge 102 creates a conference and the attendee is placed into that conference at step 308. If the entered passcode is not a valid passcode the call is terminated at step 314.

In the preferred embodiment, each user who is authorized to use interface 133 is given a login security level appropriate to their position in the system hierarchy. Those skilled in the art will recognize that different security level classifications or a different number of security levels can be used in a manner consistent with the teachings of the present invention. This information is stored in database 122. The security levels for various types of users are shown in Table 2.

TABLE 2

| Security Level | Type of User |
| --- | --- |
| Level 7 | System Administrator |
| Level 6 | Customer Service Manager |
| Level 5 | Customer Service Representative |
| Level 4 | Provider |
| Level 3 | Customer |
| Level 2 | Customer |
| Level 1 | Individual User |

The preferred embodiment of the present invention utilizes a hierarchical design for establishing security levels and related accounts. The top 3 security levels are intended to be used by employees of the entity controlling the present invention, while the bottom 4 levels are intended to be used by the customers of the entity controlling the present invention.

Users assigned to the highest 3 security levels are able to view various transaction records 200 stored in database 122 (or any other related information stored in database 122) that is associated with any system user having a lower security level. It is possible to place various restrictions on the particular type of information or transaction record 200 a user having a particular security level may view.

With respect to the lowest 4 security levels, a user at a given security level is permitted to access the information associated with a user at a lower security level, provided that the user at the lower security level is within the hierarchy associated with the user at the higher security level. A security level 4 or lower user is not permitted to view information associated with a user in a different hierarchy.

In the preferred embodiment, a security level 4 setting allows the greatest access to information stored in database 122 by an individual not employed by the entity controlling the present invention.

Figure 4:
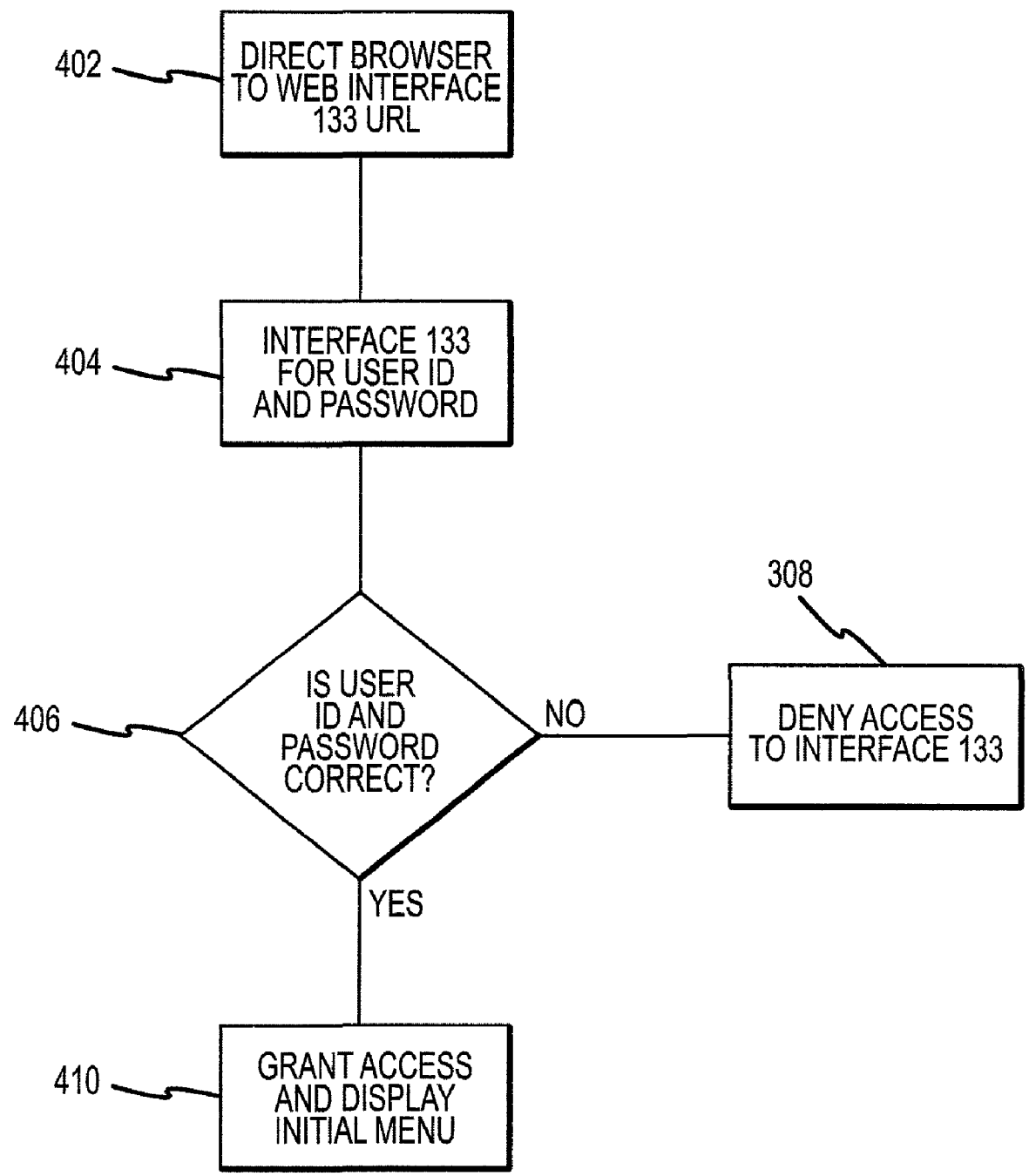
FIG. 4 depicts the process used to control a teleconferencing system via a remote computer.

FIG. 4 describes in greater detail the process used by a user to access web interface 133 by a remote computer 140. Referring to step 402, the user opens their web browser (not shown) on remote computer 140 and enters a URL for the web interface 133 into the address line of the web browser. At step 404, interface 133 prompts the user to enter a user ID and password and click on the login button at the bottom of the dialog box. At step 406, the web interface 133 compares the entered information with the information stored in billing database 122. If the information does not match, the user is denied access at step 408. If the user entered a valid user ID and password, the user will be allowed access to web interface 133 and an initial menu (not shown) having one or more of the menu categories and menu items identified in Table 3, will be displayed based on the user's security level.

TABLE 3

| Menu Category | Menu Items |
| --- | --- |
| Conferences | Conference List—Displays the current list of conferences for the month or year based on the selected filter<br>Bridge Status—A snapshot of the activity on a given bridge automatically refreshed every 20 seconds<br>Usage Summary—A breakdown of the number of ports 150 per day that were used, either by provider or a total number |
| System | Customers—Displays a list of individual customers<br>Departments—Displays a list of individual departments<br>Subscribers—Displays a list of individual subscribers |
| Providers | Information—Displays a list of individual providers<br>Contacts—Information about an individual contact within a provider that is not a customer<br>Traffic Feed—Displays data based on provider traffic<br>Invoices—A default setting that lists all open invoices for a provider |

TABLE 3-continued

| Menu Category | Menu Items |
|---|---|
| Maintenance | My Web settings—Allows a user to set their individual settings |
| | DNIS Rates—Allows ACT to set surcharges based on DNIS |
| | Termination Providers—Displays a list of individuals who provide access into the IP system |
| | Dialout Rates—Allows ACT to specify transport rates |
| Logout | Logout—terminate access to web interface 133 |

FIG. 5 depicts the conference list web page 501 that is displayed when the user selects the Conference List menu item. Conference list web page 501 displays, in real time, a list of conferences conducted at the users security level and below. Web page 501 defaults to the current month and year, and displays all conferences. The user can review historical conference lists and details by simply selecting the appropriate month and year in the drop-down boxes 502. The user is also given the option to switch between pages. The system can sort the view by simply clicking on the appropriate customer drop-down box 503, department drop-down box 504 and subscriber drop-down box 505. For users having a security level greater than level 4, the user can also filter teleconferences by provider, by selecting a provider from provider drop-down box 506. In the preferred embodiment, the conferences, displayed on web page 501, contain the fields identified in Table 4.

TABLE 4

| Field | Description |
|---|---|
| Conference ID | a unique number identifying the conference call |
| Conference Name | a value that is generated by combining the Conference ID and the name of the bridge 102 the conference was conducted on. |
| Date | the date the conference call was conducted |
| Start time | the conference start-time in GMT |
| End time | the conference end-time in GMT |
| Subscriber | the name of the user who hosted the conference |
| Callers | number of attendees on conference call |
| Duration | duration of conference call from the time first person joined to the time the last person disconnected |
| Connected | sum of the connection time of all participants to bridge 102 |
| Billable | sum of the billable connection time for all participants |

Referring to FIG. 5 and FIG. 16, a user can cause web interface 133 to display a conference detail web page 1601 by simply clicking on the conference name for the particular conference of interest. Web interface 133 will then display a summary of the specific conference information from the previous web page 501 plus specific details for each conference connection as set forth in Table 5.

TABLE 5

| Field | Description |
|---|---|
| Host | shows the host connection with an X |
| Dial Out | indicates the conference participant was dialed from the system |
| Port | indicates exactly what port 150 on the bridge the conference participant was on |
| Phone | shows the telephone number dialed or the DNIS number of the access gateway |
| Name | indicates the conference participant's status host/guest/dial-out |

TABLE 5-continued

| Field | Description |
|---|---|
| Blank Billing Field | this field can be used to enter information salient to the subscriber about the conference call e.g. (cost center code, matter number, charge back code, etc). The user can then click on the edit key and click on the billing reference field; type the appropriate information and click save. |

Figure 6:
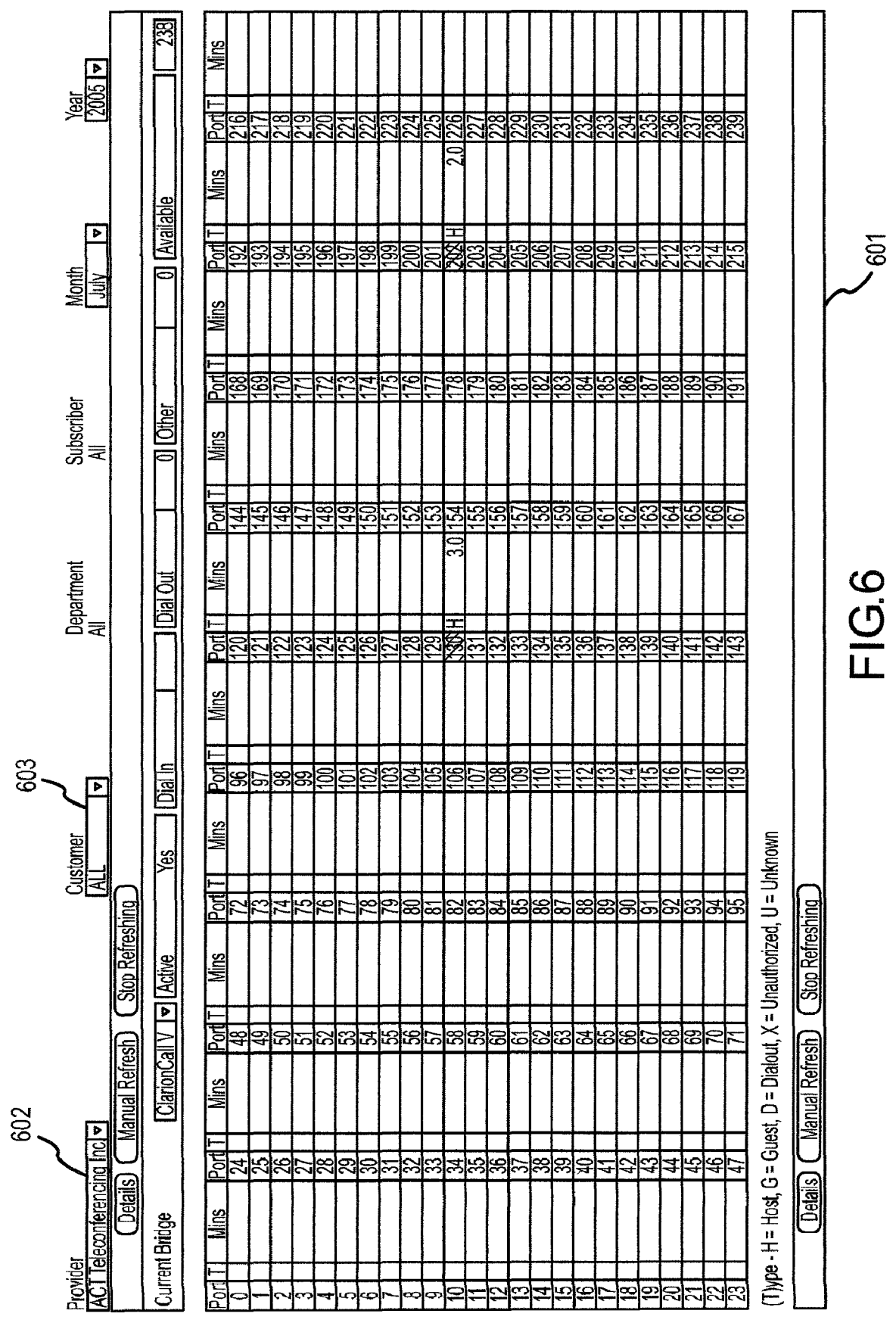

FIG. 6 depicts the bridge status web page 601 that is displayed when the user selects the Bridge Status menu item from the initial menu. Bridge status web page 601 displays a real-time view of the status of all the ports 150 being used on bridge 102. Web page 601 provides the ability to verify port 150 availability prior to creating a conference requiring a large number of ports 150 and the ability to monitor the usage load on bridge 102.

The initial view of the bridge status web page 601 is a high-level view. The status indicator label for each port 150 of bridge 601 indicates the purpose each port 150 is being used for. Additional details can be displayed by clicking on the details button 602 at the top of the page. The detailed view displays the designation (or name) of the particular port 150, conference ID, the subscriber name, the time port 150 was first used and the total amount of time port 150 was in use.

A specific customer's usage of bridge 102 can be displayed by simply clicking on the customer drop-down box 603 and selecting a specific customer. Performing this action will display the following information for a particular customer: available ports 150; type of call (dial-in/dial-out); passcode used (with a link to the subscriber's information); time connected and duration connected.

Figure 7:
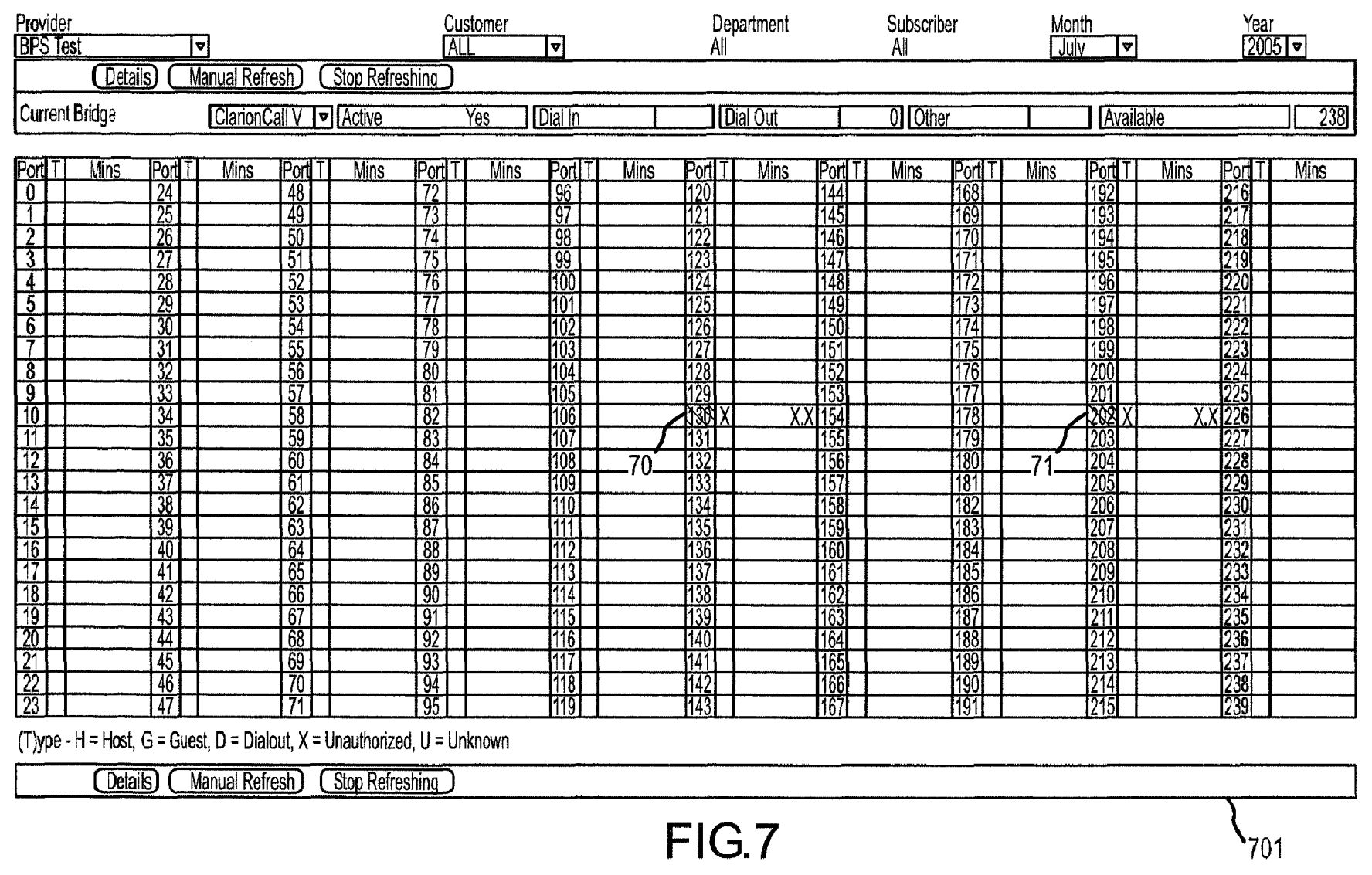

Only users with a higher security level are allowed to see details about a user having a lower security level For example, referring to the web page 701 depicted in FIG. 7, the customer viewing web page 701, is unable to view any details concerning port 70 and port 71 as indicated by the symbol "X.X".

FIG. 8 depicts a user web page 801 that is displayed when the user selects the menu item from the initial menu. Web page 801 is used for displaying: usage graphs; the number of passcodes issued; the total conferencing minutes month-to-date and annually; total conferencing revenue month-to-date and annually; percent of bridge port utilization.

The system menu has at least 3 drop down menus: providers 805, customer 806 and Department 807. By clicking on any one of menus, the user can see a summary of each level in the hierarchy. The provider drop-down menu 805 displays a summary of all customers, departments and users within the selected provider's hierarchy. In the preferred embodiment, this menu is accessible only to administrative staff with an access level of 5 or higher and provides a summary of all providers in the system. The provider ID, name, billing address information, assigned bridge and system status will also be displayed.

The customer drop-down menu 806 displays a summary of all customers within a selected hierarchy. The customers are listed alphabetically with all departments listed for each customer.

The department drop-down menu 807 displays a summary of all departments established within a selected customer. This information may be listed alphabetically by department name with the provider name and customer name as headers.

FIG. 9 depicts the customization web page 901 that is displayed when the user accessing web interface 133 selects the my web settings menu item from the initial menu. Web page 901 displays the available customization features. For example, a security level 4 user can change the customer, department and subscriber labels of the top level menus to reflect the appropriate nomenclature for each business using the present invention. Once changed, every user within that hierarchy who logs on to the system will see the new label names.

Each user can also change their password, greeting name and e-mail address. They can also change the page layout of their account (e.g., number of records displayed per page, how the subscribers are listed and if they would like the providers name listed). Any changes submitted on web page 901 will be saved in database 122 and will be effective the next time the user logs into web interface 133.

FIG. 10 depicts the new customer web page 1001 that is used to add a new customer, such as a business, to database 122. The appropriate billing and contact information is submitted to web page 1001, via interface 133. The maximum number of subscribers a customer is permitted to have at any time can also be limited by placing an appropriate value in field 1005. Once all information has been completed the person submitting the information to interface 133 clicks the save button and the information is stored in database 122.

Web page 1001 also displays relevant information for each customer such as the customer name, contact name, type of contact e.g. (technical, billing, sales, etc.), their phone number, fax number, city, state and country.

Figure 11:
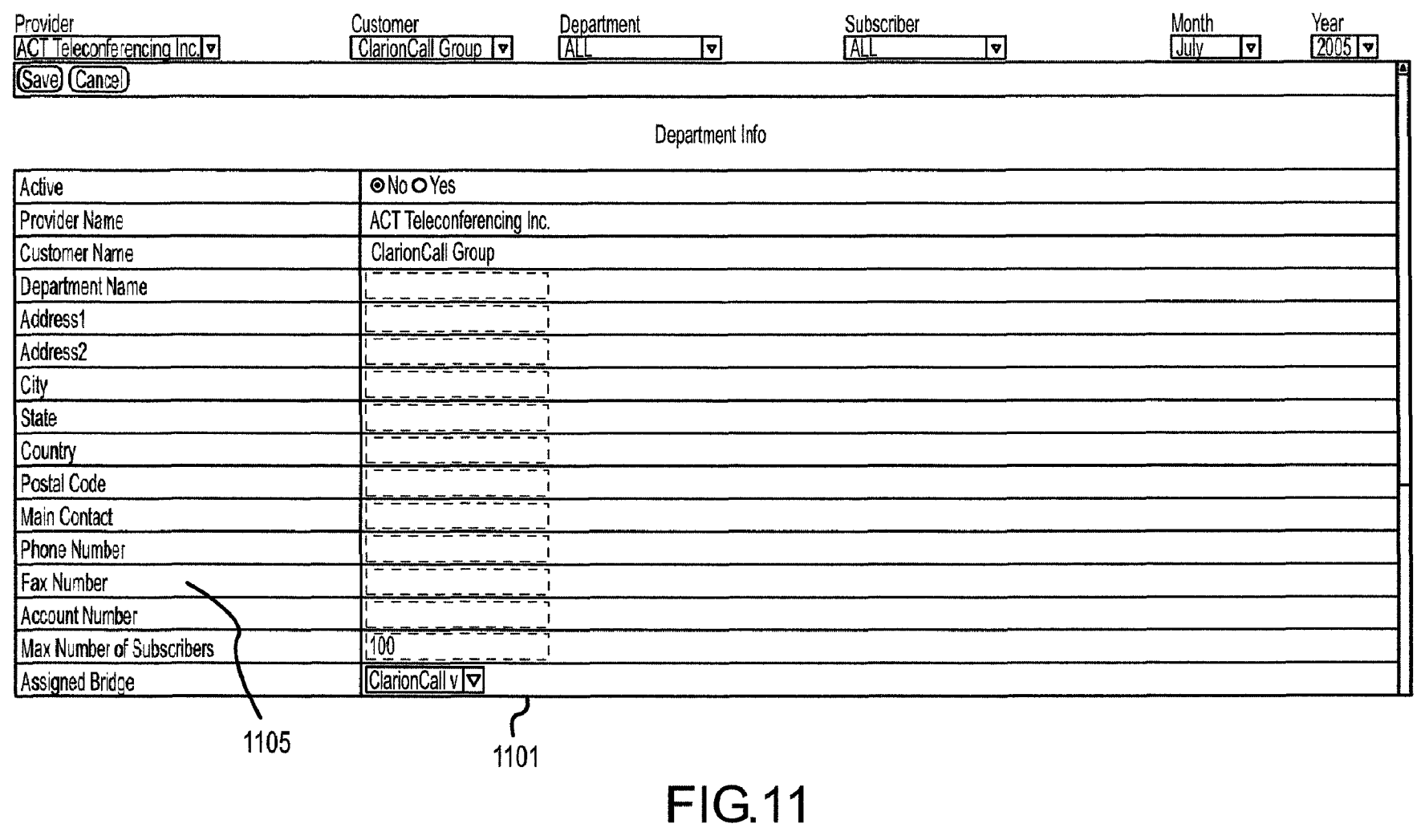

FIG. 11, depicts a new department web page 1101 that is used to add information for a new department to database 122. Once the customer information has been stored in database 122, one or more new departments may be added to database 122 by submitting a completed new department web page 1101 to interface 133.

FIG. 12 depicts a new subscriber web page 1201 that is used to add a new subscriber to database 122. One or more new subscribers can be added to database 122 by submitting a new subscriber web page 1201 to database 122, via web interface 133.

FIG. 13 depicts a create bulk subscriber web page 1301 that is used to quickly add information concerning a number of subscribers to database 122. Web page 1301 is used to support a reservation-less unattended conferencing platform.

Passcodes are typically generated in pairs, host and guest. By entering a host passcode into bridge 102 from telephone 108, a conference can be initiated, administrative functions can be performed and billing for the conference commences.

In addition, a user can access the detail call records for any customer, department, or subscriber below them in the hierarchy. The user can also activate, deactivate any level within the hierarchy thereby activating, deactivating all host/guest passcodes issued at and below that level.

Web page 1301 can be used to: create individual and bulk subscriber accounts; activate and deactivate passcodes; restrict the usage to predetermined limits; enable special conference feature by passcode; and set expiration dates of the passcodes. Generating passcodes is a powerful feature of the system. In the preferred embodiment only users having a security level 3 or greater authorization are permitted to create passcodes. In creating a host/guest passcode pair, the features identified in Table 6 can be assigned to any given user and stored in database 122.

TABLE 6

| Category | Features |
| --- | --- |
| Host Information | Passcode (this can be randomly selected or specifically requested, if available)<br>Subscriber name<br>Account expiration date<br>Telephone number<br>FAX number<br>Email address<br>Company name<br>Account number |
| Passcode Features | Talk/listen mode<br>Entrance tones<br>Exit tones<br>Record participant names<br>Play custom greeting message |
| Account limits | Maximum participants per conference<br>Maximum minutes per conference<br>Total number of conferences allowed<br>Total conference time limit |

There are three ways passcode numbers can be assigned to each user using web page 1301. First, a random passcode can be designated for each user. Second, each passcode can by selected sequentially within a given starting and ending range, depending on availability. Finally the host and guest passcodes can be selected randomly.

Once bulk passcodes are created, a customer level user might wish to assign and activate bulk passcodes by using spreadsheet software or another third-party application. This is facilitated by downloading the passcodes to remote computer 140, from database 122, via web server 130 and interface 133. Passcodes can be downloaded in comma-delimited format to a the remote computer 140, modified, and returned to database 122. This eliminates the need to activate and assign passcodes one by one, especially if hundreds of passcodes are being generated.

FIG. 14 depicts the passcode troubleshooting web page 1401 feature. By submitting a passcode on this web page to interface 133, web server 130 will analyze the submitted passcode and display a message in window 1405 indicating the reason why the passcode is not valid (e.g., the account is expired, the maximum number of conferences has been reached, the passcode is not activated, the user is not activated). Those skilled in the art will recognize that when managing large numbers of subscribers, it is more efficient to have the system determine the cause of potential problems with a passcodes.

Billing server 120 cycles through a checklist of items to check to determine the cause of a problem. If any of these items are returned as 'true' a message is compiled and displayed in a pop-up window 1405. This window 1405 might contain one or more elements that need to be corrected before a passcode can be used again. FIG. 15 depicts a subscriber status web page 1501 in which, passcodes that are expired, unassigned or inactive are displayed in red in column 1505.

Figure 17:
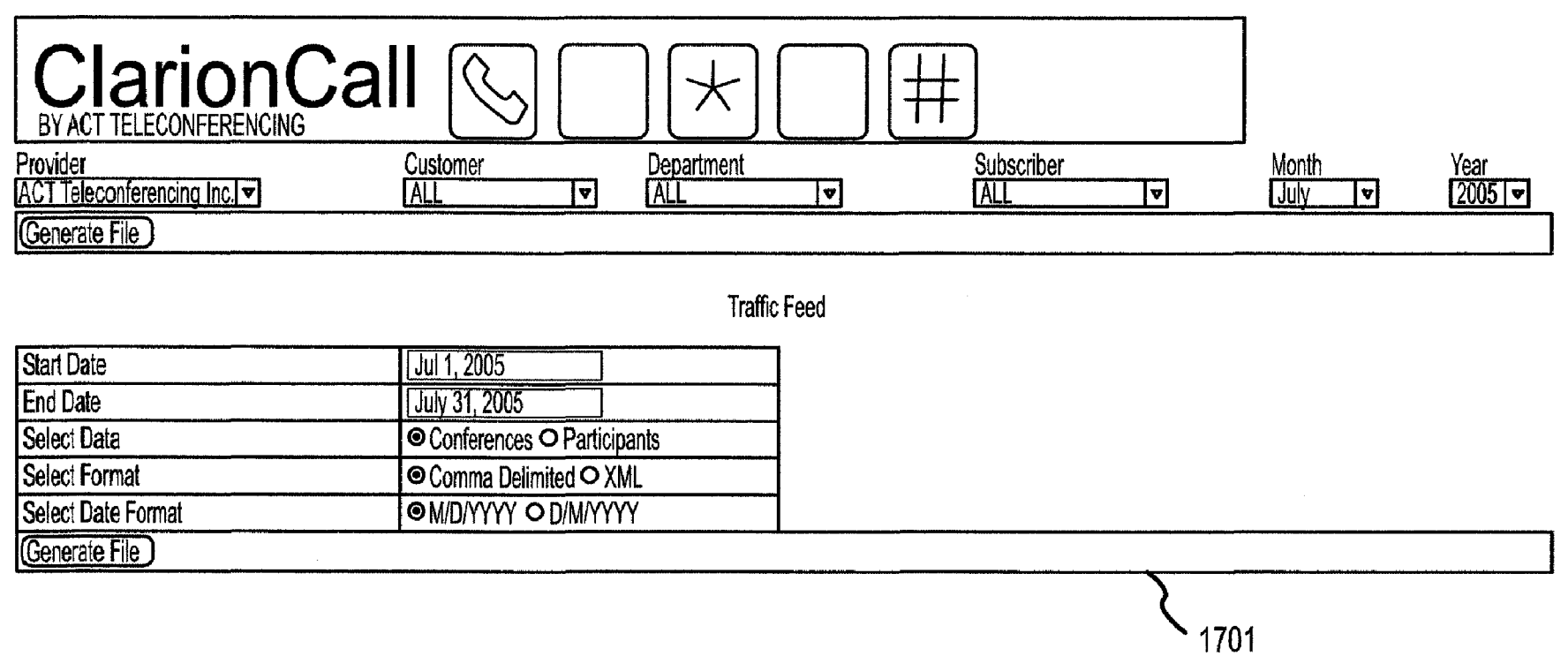

FIG. 17 depicts the traffic feed web page 1701 which is valuable to commercial teleconferencing service providers that resell bridge conferencing services and must be able to quickly retrieve billing information from database 122. Web page 1701 allows information to be downloaded from database 122 to remote computer 140 based on: the date range of conference activity; the type of billing record (Conferences or Participants). In addition, the file format (Comma Delimited or XML) and the date format of the information to be downloaded may be specified.

In the preferred embodiment, the data may be displayed and downloaded in two data formats, Conference and Participant. The data is arranged in a one-to-many format, one conference with many participants. Most commercial service providers need to differentiate between the two in order to properly bill their respective customers for the calls.

In addition, the present invention supports the transmission and receipt of data in traditional comma-delimited format as well as XML format. In addition, billing server 120 formats the data to be downloaded to remote computer 140 in a ZIP formatted file thereby reducing download time for users with slower Internet connections.

Figure 19:
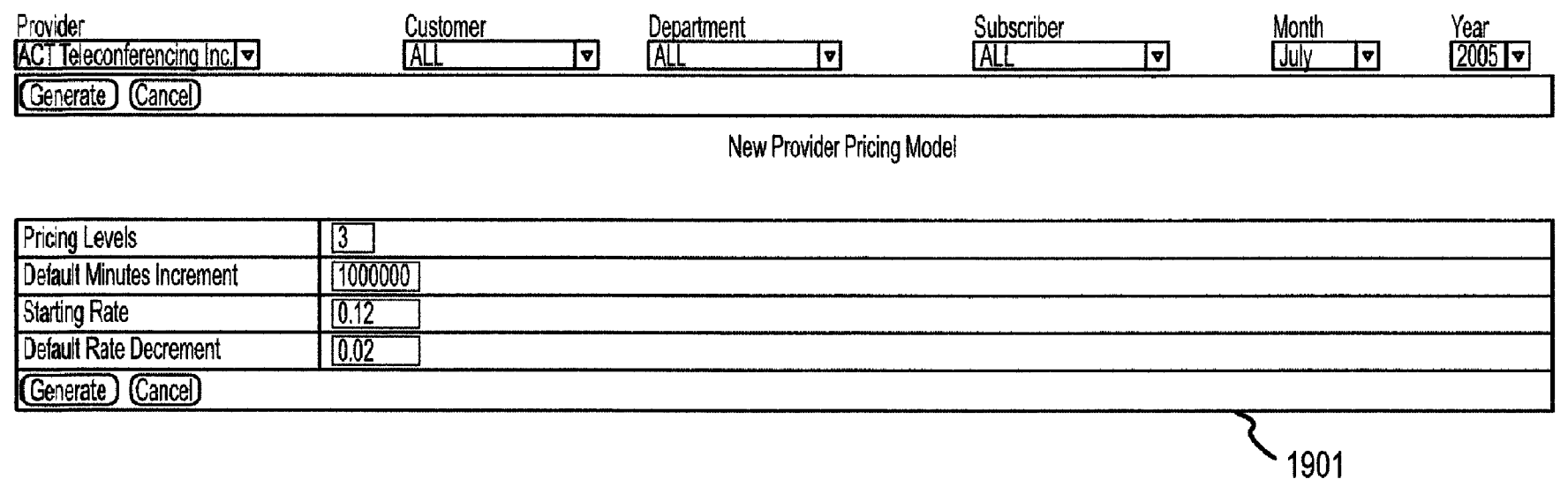

Referring to FIG. 18 and FIG. 19, the present invention also provides online invoicing tools. This powerful feature displays a real-time preview of any invoice. After a billing cycle has been closed, invoices are also available for display via web interface 133.

A pricing module is depicted in FIG. 18 and FIG. 19. Specifically, FIG. 18 depicts a provider pricing model display web page 1801. Web page 1801 allows pricing breakpoints to be applied to transactions 200 and related billing information stored in database 122. In addition, web page 1801 allows various volume discounts to be applied.

FIG. 19 depicts a provider pricing model entry web page 1901. Web interface 133 analyzes the information entered into web page 1901 to ensure that a user doesn't incorrectly create overlapping breakpoints, or having price points that don't add up correctly. In the preferred embodiment, this option does not appear on the available menu choices for a user who does not have at least a Level 5 access.

Referring again to FIG. 19, to create a new pricing model, information is supplied to interface 133 via web page 1901: which includes the number of pricing levels; the number of conference minutes between each level; the starting rate per minute of bridge usage and the rate to decrement per level.

FIG. 20 and FIG. 21 depict various versions of an invoice list web page 2001 and totals mode invoice display web page 2101. Web pages 2001 and 2101 are used to create invoices such as the printable invoice 2201 displayed in FIG. 22. Web server 130 can retrieve information from database 122 for display via interface 133 upon request. In the preferred embodiment, only web users with Level 4 access are permitted to view web pages 2001 and 2101.

To generate and display an invoice, a provider must be selected from pull-down menu 2105. Web page 2001 displays a list of all invoices currently generated for the selected provider. Web page 2001 summarizes the invoice period, any description of the service, and a total amount due for each invoice. Selecting a displayed invoice number displays the selected individual in the format of web page 2101. This information includes: Invoice date; provider information; date last generated; total amount due; effective billing date; conferencing rate and dial-out and surcharge minutes.

The invoice also displays the billable activity of each customer and department levels (as created in the tiered hierarchy). Links to details of the sub-levels are provided.

Those skilled in the art will recognize that printing from a web browser can often generate unpredictable output. Graphics, inconsistent page breaks and browser overhead often prevent users from printing formal documents from the web.

The present invention offers a solution in providing printable page windows. Pressing the Print button from anywhere in the application brings up a pop-up window (not shown) with a printer-friendly version of the page or report. The same holds true for invoices, such as the printable invoice 2201 displayed in FIG. 22.

The present invention also automates the traffic retrieval process. A customer isn't restricted to manually downloading traffic files from a web page, rather, the ability to automate this process between a customer's billing engine and the present invention is provided as follows.

Using an HTTP request, a customer can request data, for a specific time period, from database 122 to be downloaded to remote computer 140. An SSL connection is established between the remote computer 140 and the web interface 133 to provide security. Once the request is made, an Active Server Page (ASP) page (residing on web server 130) makes a connection to the database 122, runs a query, and passes the data back to remote computer 140 via an HTTP data stream.

Web interface 133 also provides an automatic traffic feed option. Additional parameters must be provided in order for the request to be processed by web server 130. The following Table 7 is a list of both required and optional parameters.

TABLE 7

| Parameter | Description |
| --- | --- |
| User | REQUIRED—Contains the username that is making the request. This user must already exist in the system prior to making the request. This is the same username that is used to access the web interface 133. The username is not case sensitive: |
| Pass | REQUIRED—Contains the password associated with the username. While the original password is case sensitive, its encrypted string is not. The password is the only parameter that must be encrypted. The purpose of encrypting the password is to prevent unauthorized access web interface 133 by individuals obtaining the URL (from a browser's history for example). In the preferred embodiment, the password must be encrypted using the following steps:<br>1. Convert each character to its ASCII value<br>2. Subtract 25 from each value<br>3. Subtract the position of each value (starting with 1) from each value<br>4. Convert each resulting value to HEX<br>5. Reverse the final string |
| StartDate | OPTIONAL—The starting date of the range of data being requested. If not present or an invalid date is provided, the date one day prior to the current date will be used. Must be in the following format M/D/YYYY. |

TABLE 7-continued

| Parameter | Description |
| --- | --- |
| EndDate | OPTIONAL—The ending date of the range of data being requested. If not present or an invalid date is provided, the starting date will be used. If the StartDate and EndData parameters are the same, only one day's data will be returned. Must be in the following format M/D/YYYY. |
| Type | OPTIONAL—The type of data being requested. The only valid values are "C" to request a list of conferences and "P" to request a list of participants. If not present or an invalid value is provided, "C" will be used. |
| Format | OPTIONAL—The format of the data being returned. The only valid values are "Comma" and "XML". If not present or an invalid value is provided, "Comma" will be used and the data will be returned in comma-delimited format. If "XML" is used, the Type parameter will be ignored because the returned data will contain both conferences and their participants is a hieratical structure. |
| DateFormat | OPTIONAL—The format of the date field being returned. The only valid values are "US" and "NonUS". If not present or an invalid value is provided, US will be used. When set to US, the returned date fields will be in M/D/YYYY format. When set to NonUS, date fields will be formatted using D/M/YYYY. |

When needed, web server 130 will return errors in place of data. The following Table 8 identifies a list of possible error messages and their causes.

TABLE 8

| Error Message | Cause |
| --- | --- |
| Invalid Username | Either no username was provided or the username was not found in the database. |
| Invalid Password | Either no password was provided or the password did not match the user's password when decrypted. |
| No Data | No data was available for the date range specified in the request. |

Referring again to FIG. 1, those skilled in the art will recognize that because MAT 104, listener 114, billing server 120 and web server 130 are preferably implemented as software residing on a workstation or other processing platform, it is possible to combine or rearrange the functionality of the various devices. For example, listener 114 could be eliminated, and billing server 120 programmed to implement some or all of the functionality of listener 114. Furthermore, those skilled in the art will recognize that billing server 120 and web server 130 can be combined and executed on a single general workstation.

Similarly, FIG. 1 identifies several connections between various components. For example, Internet 135 is described as connecting web server 130 to remote computer 140. Those skilled in the art will recognize that other data connections, such as a circuit based connection, could be substituted for internet connection 135.

Figure 23:
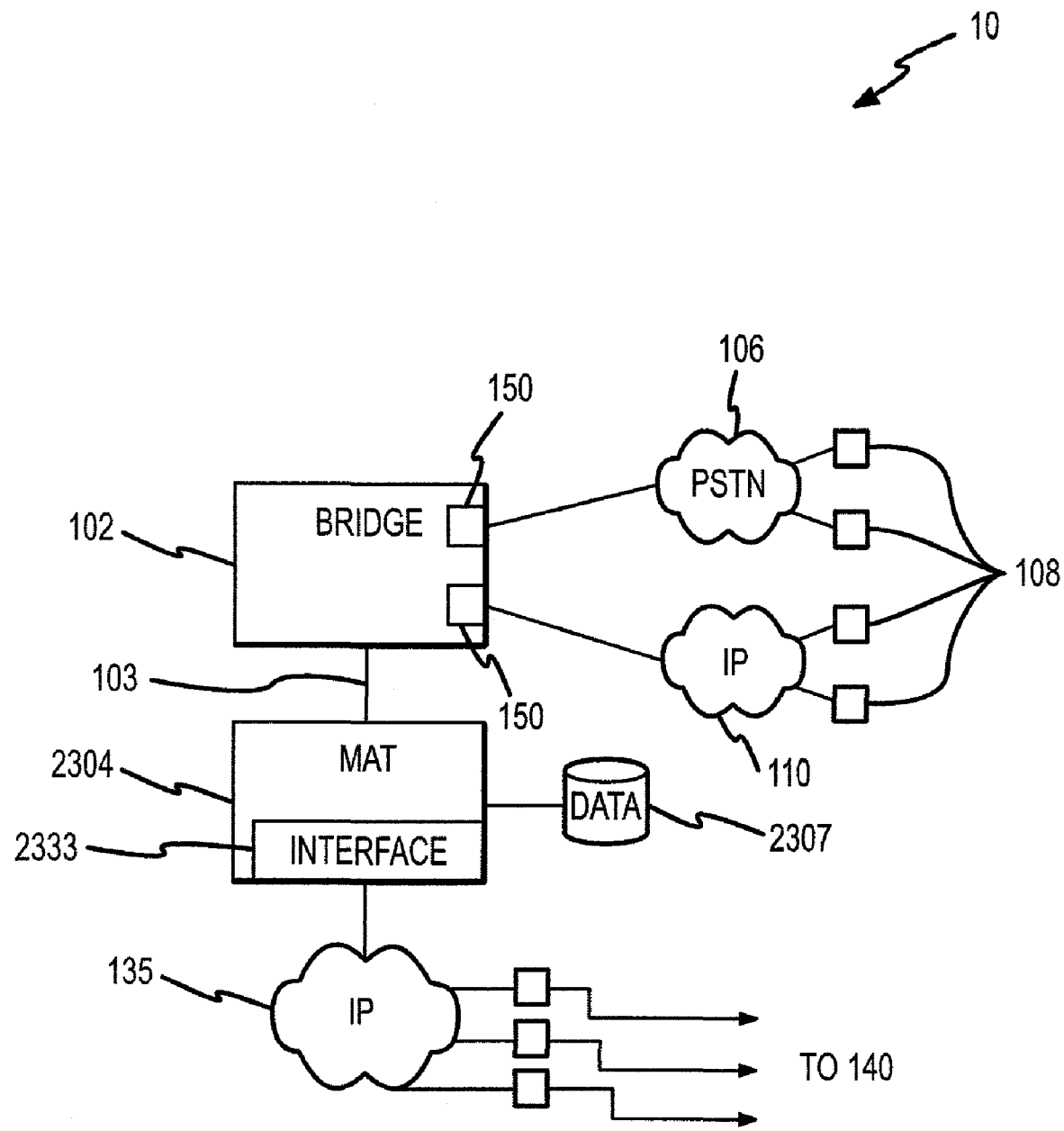
FIG. 23 depicts an alternate embodiment of the present invention.

Other configurations are possible. For example, FIG. 23, discloses an alternative embodiment of the present invention. Components having the same function as described in FIG. 1 have retained the same numerical identification. FIG. 23 discloses, the use of a combined MAT 2304 connected to bridge 102, combined database 2307 and internet 135 via interface 2333. Combined MAT 2304 contains the functionality of MAT 104, listener 114, billing server 120 and web server 133. Those skilled in the art will recognize that the use of combined MAT 2304 reduces the costs associated with multiple devices. Such a configuration, however, may be less reliable because of lack of redundant databases and workstations.

Figure 24:
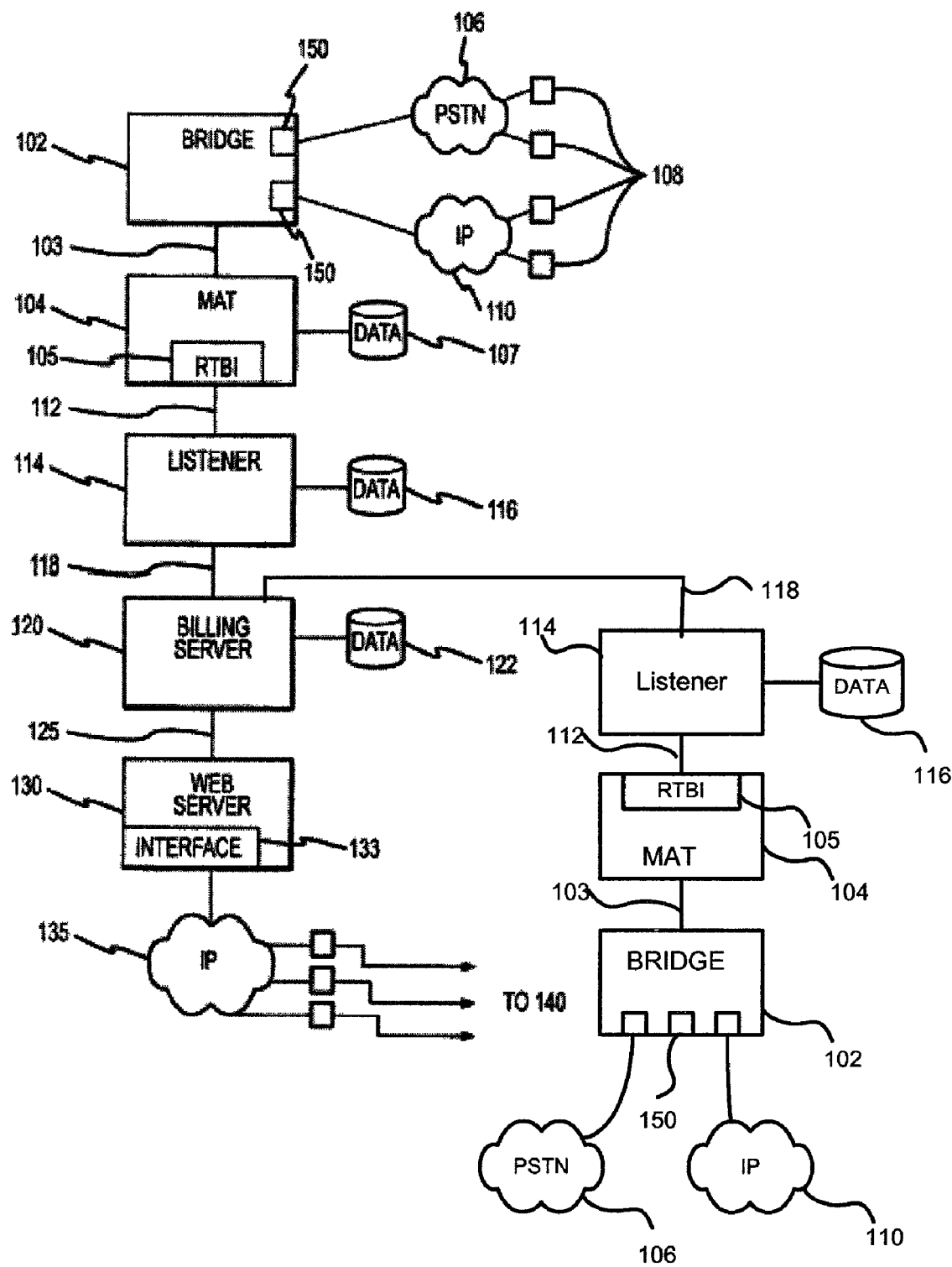
FIG. 24 depicts an alternate method and embodiment of the present invention.

Another embodiment, shown in FIG. 24 discloses a method and configuration for controlling multiple bridges 102, by using multiple listeners 114. Components having the same function as described in FIG. 1 have retained the same numerical identification. In this particular embodiment, MAT 104 is connected to multiple listeners 114.

Figure 25:
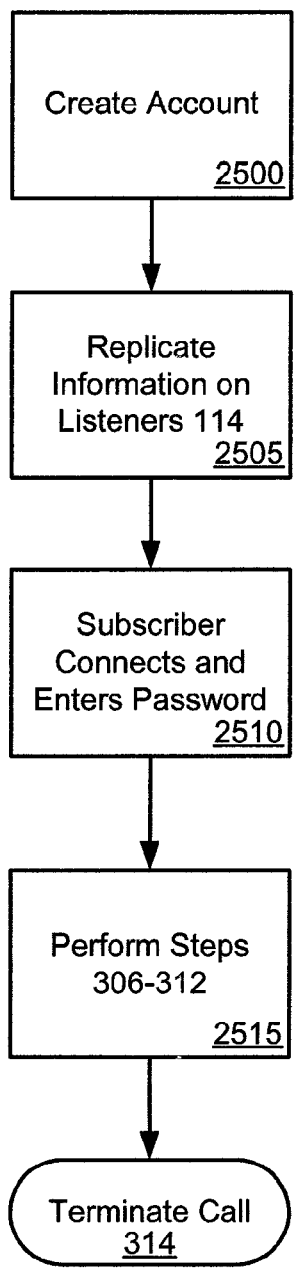
FIG. 25 depicts one process in accordance with some embodiments of the present invention for controlling a system in accordance with one or more embodiments of the present invention.

FIG. 24 and FIG. 25 describes in greater detail the process used to control the system 100 of the present invention. As shown in step 2500 a user accesses system 10 to create an account for an attendee and either assigns or has system 10 automatically create appropriate host or guest passcodes for each user. At step 2505, this information is replicated to the listeners 114 connected to MAT 104. At step 2510, the attendee using a telephone 108 connects to bridge 102 via PSTN 106 or IP connection 110 and upon connecting, bridge 102 prompts the attendee to enter a guest or host passcode.

Step 2515, is similar to steps 306 through 312 described in FIG. 3. Specifically, bridge 102 has the MAT 104 that is connected to it search its corresponding database 107 to determine whether the passcode entered by the attendee matches the passcode to a conference call currently in progress on that bridge 102. If the entered passcode matches the passcode of a conference already in progress, the attendee is placed into that conference. If the passcode does not match the passcode associated with a conference currently in progress, the bridge 102 has the MAT 104 connected to it search its database 107 to determine whether the passcode entered by the attendee matches the passcode associated with a conference that is scheduled to start around the time of the attendee's call. If the entered passcode matches the passcode of a conference that is scheduled to start around the time of the attendee's call, the attendee is placed into that conference. If the entered passcode does not match the passcode of a conference that is scheduled to start around the time of the attendee's call, bridge 102 issues a query to database 116 attached to the listener or listeners 114 connected to the MAT 104 that is connected to the bridge 102 making the request, to determine whether the entered passcode is a valid passcode. If the entered passcode is a valid passcode, bridge 102 creates a conference and the attendee is placed into that conference. If the entered passcode is not a valid passcode the call is terminated at step 314.

As previously mentioned, some embodiments of the present invention provide for systems and methods to handle situations when two or more participants are to be linked in a common communication session, but that may have attempted to join the common communication session by dialing into two or more separate bridges.

Figure 26:
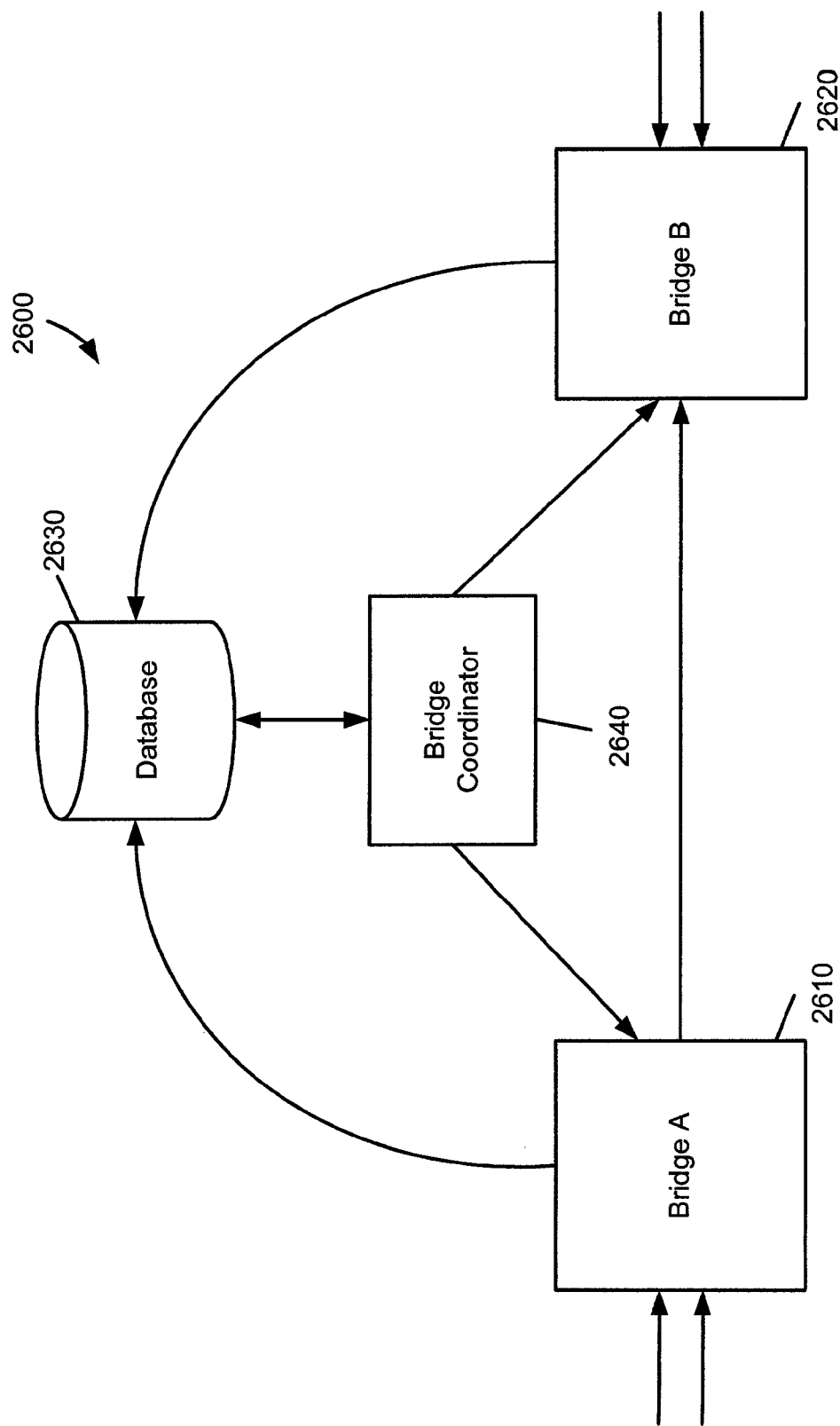
FIG. 26 illustrates an exemplary dynamically linked bridge formed using a bridge coordinator in accordance with one or more embodiments of the present invention.

FIG. 26 illustrates an exemplary dynamically linked bridge 2600 formed using a bridge coordinator 2640 in accordance with one or more embodiments of the present invention. In the illustrated embodiment, one or more dial-in participants desiring to initiate a communication session, such as a conference call, dial into bridge A 2610. In addition, one or more dial-in participants desiring to participate in the same communication session dial into bridge B 2620. As will be discussed in more detail below, bridge A 2610 and bridge B 2620 may register with a central database 2630.

Bridge coordinator 2640 monitors central database 2630 and determines when dial-in participants desiring to participate in the same communication session have accessed different bridges. In some embodiments, bridge coordinator 2640 may be a software application. In other embodiments, bridge coordinator 2640 may be implemented in a combination of hardware, software, and/or firmware. Physically, bridge coordinator 2640 may be collocated or embedded with one of the bridges. In other embodiments, bridge coordinator 2640 may be an independent server communicably coupled with a database and/or one or more of the bridges within the communications network. Still yet, in other embodiments bridge coordinator 2640 may be combined with central database 2630.

According to one embodiment of the present invention, bridge coordinator 2640 is able to determine when dial-in participants desiring to participate in the same communication session have accessed a bridge on the network. In some embodiments of the present invention, this determination is made by monitoring passcodes. Passcodes may be issued in pairs comprising a host or moderator passcode and a guest passcode. The host passcode generally allows for the user to perform one or more administrative functions associated with the call. Examples of administrative functions include, but need not be limited to, starting/stopping the communication session, initiating recordings, disconnecting participants, and/or the like. Participants using the guest passcode, in contrast, may be limited to controlling one or more features of their own communication link.

As mentioned, bridge coordinator 2640 may determine when dial-in participants desiring to participate in the same communication session have accessed different bridges. In one embodiment, bridge coordinator 2640 recognizes when passscodes of the same set, host and/or host passcodes, are in use on one or more bridges. According to one embodiment, bridge coordinator 2640 may poll, or seek information from, the bridges in the network. This information may include the communication session passcodes associated with that participant. Other information about the communication session may include the location of the bridge, a bridge identifier, a port number, and/or the like. In other embodiments, each bridge in the network reports information relating to all of the communication sessions being routed through that bridge to central database 2630. Central database 2630 may report this information to bridge coordinator 2640 on a predetermined schedule which may be periodic or predefined in a look-up table. Other embodiments provide bridge coordinator 2640 the ability to poll the database for information relating to the communication sessions occurring on the network. In one embodiment, bridge coordinator 2640 stores the host passcode of all active sessions found. Then, when a new guest passcode is found, bridge coordinator 2640 determines if there is a matching host passcode present.

When bridge coordinator 2640 determines that dial-in participants desiring to participate in the same communication session have accessed different bridges, bridge coordinator 2640 may then identify a host for a particular communication session. This may be done, for example, using the information collected from the central database, the bridges in the network, and/or using information stored within bridge coordinator 2640. According to one embodiment, a host is identified by the host passcode. If multiple host passcodes have been used for the same communication session, then according to one embodiment, bridge coordinator 2640 may select as the host bridge the bridge with which the host passcode was registered first in time.

Once a host bridge is identified or selected by bridge coordinator 2640, information may then be collected about the host bridge. For example, information about the host bridge may include, but need not be limited to, a dial-up number, an IP address, physical location, and/or the like. In one embodiment, information about the host bridge may be collected by performing a look-up from a dial-string table within central database 2630. In some embodiments, the dial-string look-up table may contain information relating to the phone number of bridge B 2620 and the location of bridge A 2610. In one embodiment, the look-up table may be populated with the bridge information by an administrator at the time a bridge is added to the network. In another embodiment, the bridges are configured to automatically send information to populate the look-up table on predetermined schedule (e.g., a periodic schedule or on a user defined schedule).

In any event, once the phone numbers and locations are determined, bridge coordinator 2640 initiates a dial-out command from bridge A 2610 to bridge B 2620. Following an appropriate validation process, the parties will be joined. According to one embodiment, the validation process comprises checking the that the host and guest passcode correspond to the same communication session. In some embodiments, encrypted validation keys may be sent from each bridge to the bridge coordinator. In this case, the bridge coordinator will decrypt the key and verify that the parties should be joined.

The following example illustrates one approach for joining a communication session between multiple participants using DBL in accordance with an embodiment of the present invention. Suppose a caller A dials into bridge A 2610 by using a telephone number. Once bridge A 2610 answers the caller may be prompted to enter a passcode which was assigned to the communication session he desires to join. The passcode may then be validated by the system and the communication session is started at bridge A 2610. According to one embodiment, the validation process may comprise looking up the passcode in a predefined list. In other embodiments, the passcode validation process may comprise determining a certain characteristic of the passcode is present. For example, in order for a passcode to be valid one or more of the following properties may need to be present: the passcode is divisible by a certain number, the sum of the digits of the passcode are even, or any other scheme know to those skilled in the art. Once the validation process is complete, an entry may then be made in a database table located in a central location database 2630 indicating that caller A is online. One example of such a table is presented in FIG. 31. According to one embodiment, bridge A 2610 initiates a transmission to central database 2630 that caller A is online. In another embodiment, central database 2630 polls each bridge in the network to determine which callers are online and make the appropriate recordation in the database table. In either case, the entry in database 2630 may include one or more call parameters. For example, the entry may include the bridge ID (i.e., an identifier unique to the bridge connecting caller A to the network), a port number of the bridge through which the call is being routed, and a passcode entered by the participant.

Similarly, when caller B dials into bridge B 2620 desiring to join a communication session, bridge B 2620 prompts caller B to enter a passcode for the desired communication session. The passcode may then be validated by the system. In one embodiment, the passcode is validated by bridge B. In another embodiment, the passcode is validated by bridge coordinator 2640. The validation process may comprise looking up the passcode in a predefined list. In other embodiments, the passcode validation process may comprise determining a certain characteristic of the passcode is present. For example, in order for a passcode to be valid one or more of the following properties may need to be present: the passcode is divisible by a certain number, the sum of the digits of the passcode are even, or any other scheme know to those skilled in the art. After the code is validated, communication session begins on bridge B 2620. According to one embodiment, an entry is then made in a database table located in a central location indicated that caller B is online. This entry may result from bridge B reporting that caller B is online once the validation process is complete. As another example, central database 2630 may poll bridge B on a predefined schedule. In some embodiments, the database entry makes note of one or more of the call parameters such as the bridge ID (i.e., an identifier unique to the bridge connecting caller B to the network), port number associated with bridge B through which the communication session is being routed, a passcode that was entered by caller B, and/or the like.

However, bridge B 2620 is unaware that the same communication session is already in progress on bridge A 2610. In addition, bridge A 2610 is unaware that the same communication session is already in progress on bridge B 2620. According to one embodiment, bridge coordinator 2640 monitors the activity of all the bridges. In some embodiments bridge coordinator 2640 monitors the bridge activity by polling central database 2630 in which entries are present regarding active communication sessions. In other embodiments, bridge coordinator 2640 sends a request to each bridge requesting information about active communication sessions. In some embodiments, the information returned by either the bridge coordinator or the bridges contain the communication session passcodes that were entered by the callers. When bridge coordinator 2640 recognizes the passcodes assigned to the same communication session, bridge coordinator 2640 determines a bridge that will act as a host bridge for the communication session.

According to one embodiment, a host bridge is the bridge through which the communication session will be routed. In some cases, determining a bridge that will act as a host bridge may be done by determining if the bridge is associated with a host passcode. In other instances, additional information may be used to determine if the bridge should be a host bridge. For example, suppose caller B dials into bridge B 2620 and enters a host passcode. In this case, bridge coordinator 2640 may also determine if bridge B has available capacity to host the communication session, if bridge B provide the least cost for routing the communication session (i.e., least cost routable), and/or the like. If it is determined that bridge B does not have the available capacity, bridge coordinator 2640 may determine an alternate bridge to act as a host bridge. Again, this may be done using one or more of a variety of selection criteria such as bridge capacity, least cost routable, and/or the like.

Once a host bridge is determined, the bridge controller may perform a look-up from a dial-string table within central database 2630 to determine the phone number of host bridge. According to some embodiments, the dial-string table may also contain the location of the host bridge. Once the phone numbers and locations are determined, bridge coordinator 2640 may initiate a dial-out command from the other bridges associated with the communication session to the host bridge.

As previously described, in many situations there will be a host and guest passcode. So, multiple hosts may dial into a call, and it is the host who has control over the call's functionality. The callers with the guest passcode generally have a non-managerial role in the call. As such, according to one embodiment, the bridge that contains a host participant that dialed in first will become the host bridge, i.e., it is from this bridge where all linking of the communication session will occur. For sake of explanation, assume that bridge A 2610 is the host bridge.

In that case, continuing with the detailed call flow, the bridge coordinator will instruct bridge A 2610 to initiate a dial-out to the bridge B 2620. According to one embodiment, this dial-out process rings the remote bridge, bridge B 2620, and on answer, will send via a DTMF string, the guest passcode of the call. In some embodiments, the passcode will be validated and the line joined into the communication session, thus linking the two bridges.

This process may be repeated for each subsequent bridge containing a participant using either the host of guest passcode from the same set. Then, at the conclusion of the call, the host will end the communication session by automatically tearing down all the linked lines to the other bridges.

Figure 27:
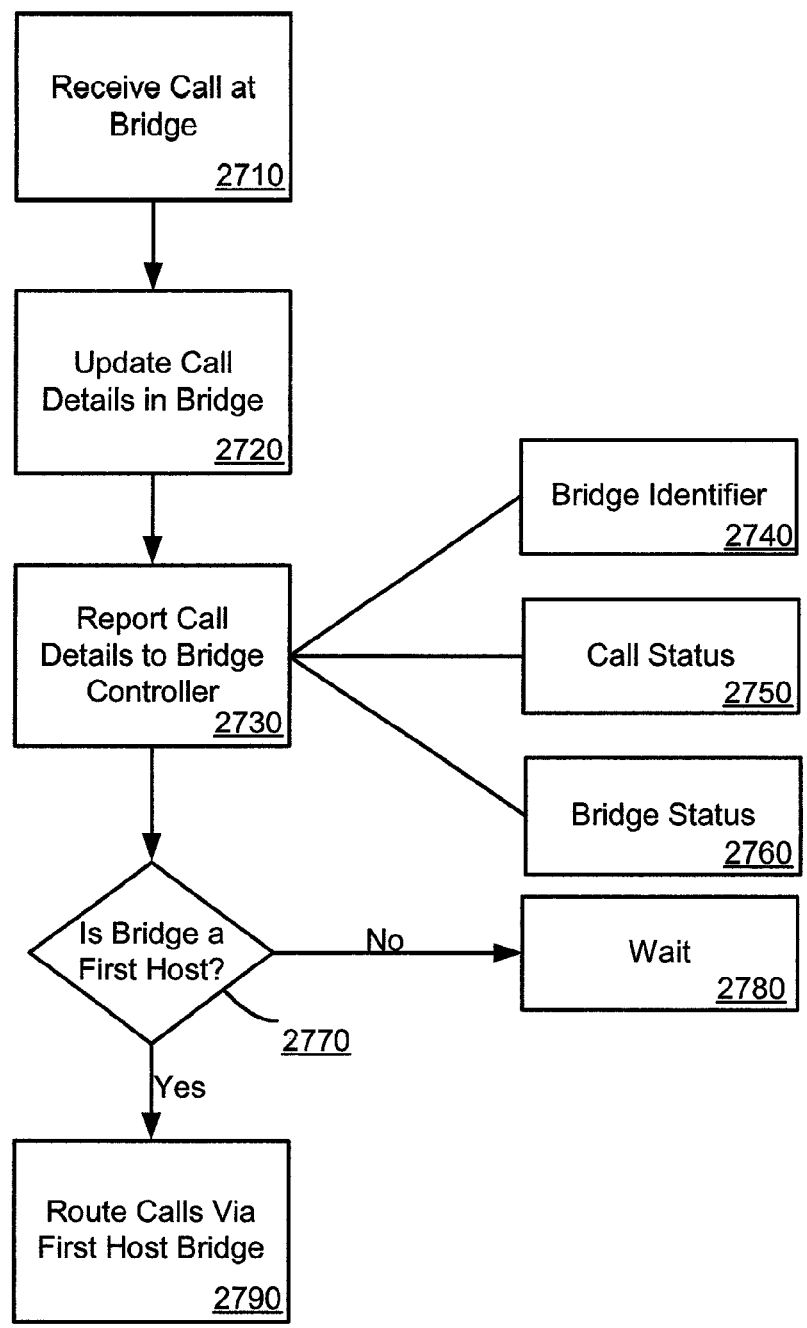
FIG. 27 illustrates a flow diagram of call routing in accordance with some embodiments of the present invention.

FIG. 27 illustrates a flow diagram of call routing in accordance with some embodiments of the present invention. As illustrated, a bridge receives a call at block 2710. The call may originate from a call participant, an endpoint, another bridge, or from any other piece of telecommunications equipment. Once the call is received at the bridge, the bridge identifies information about the call. Examples of call information including originating number, destination number, time stamp, and/or the like. The bridge may identify call information or details in one or more ways depending on the type of communication session associated with the call. For example, the call may have associated header files which may be appropriately interpreted. Once the call information is determined, at block 2720 the call details are updated in the bridge. One or more of these call details along with relevant information about the bridge may then be reported to the bridge coordinator at block 2730. According to one embodiment, the reporting of the information may be initiated by a predetermined event such as a request from the bridge coordinator, a predefined period of time has elapsed, and/or the like. Examples of the type of information that may be incorporated in the call and bridge details may include, but need not be limited to, bridge identifier 2740, call status 2750, bridge status 2760, and the like.

At block 2770, the bridge coordinator then determines if the bridge which received the call is a host bridge. In one embodiment, a bridge is determined to be a host bridge if the communication session which is being routed through the bridge has provided a host passcode. If the bridge coordinator determines that the bridge is not a host bridge, then the bridge coordinator waits at block 2780 for call details from another bridge. If the bridge coordinator determines that the bridge is a host bridge, then all calls relating to the corresponding communication session will be routed via the host bridge at block 2790.

Figure 28:
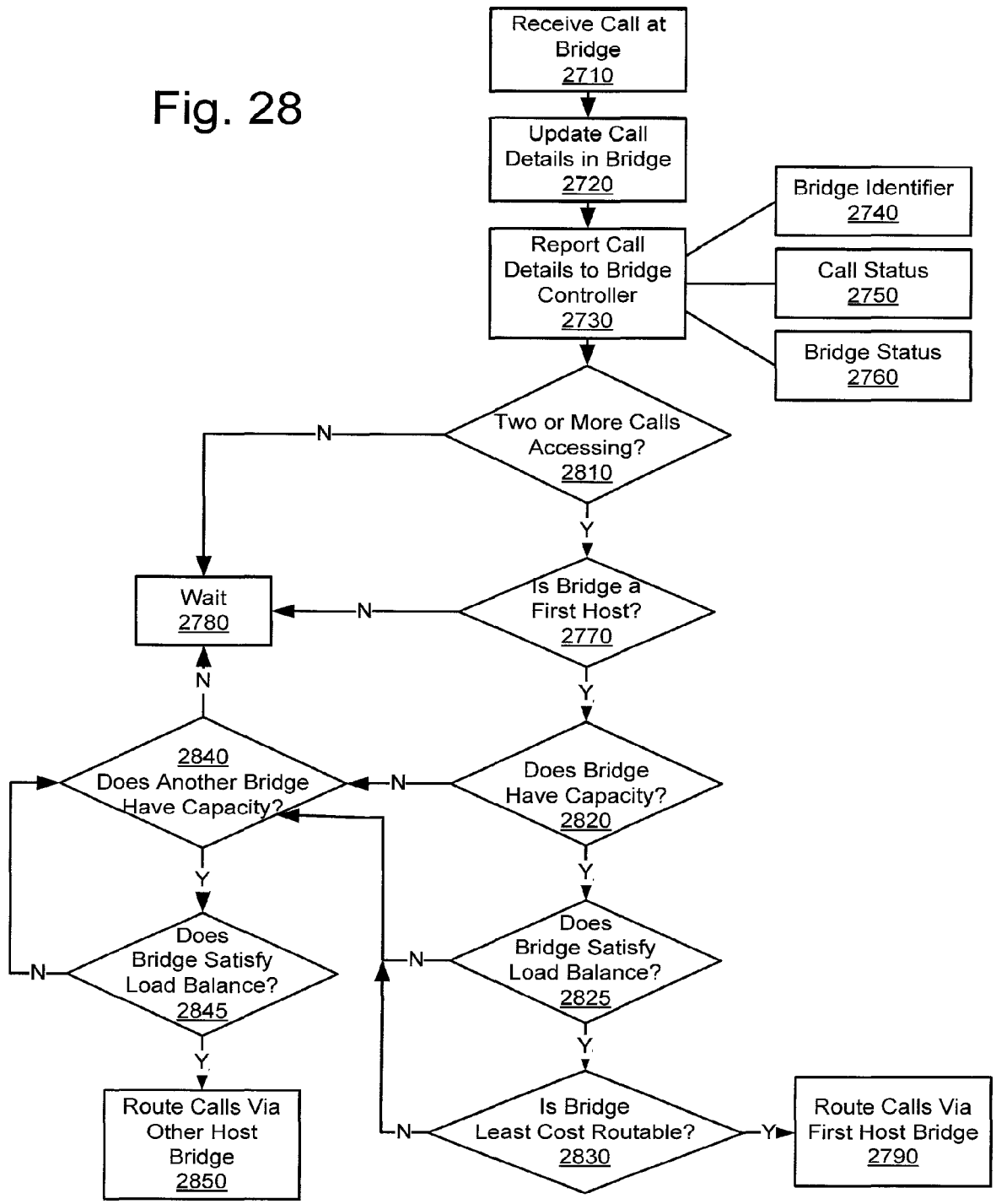
FIG. 28 illustrates a flow diagram of another call routing method in accordance with other embodiments of the present invention.

FIG. 28 illustrates a flow diagram of another call routing method in accordance with other embodiments of the present invention. As illustrated, a bridge receives a call (block 2710). The call may be part of a communication session such as a teleconference, a video conference, and/or the like. The call may originate from a call participant, an endpoint, another bridge, or from any other piece of telecommunications equipment located within or outside of the bridge network. Once the call is received at the bridge, the bridge identifies information about the call. Call information may include, for example, originating number, destination number, time stamp, and/or the like. This information may be contained within the call in a variety of manners. For example, a call identifying message may be sent along with the call, call identifying information may be contained within a packet based communications protocol, and the like. The call details are updated in the bridge (block 2720). One or more of the aforementioned call details along with information about the bridge may be reported to the bridge coordinator (block 2730). For example, this information may be transmitted wirelessly, through a telephone line, over a LAN, and/or the like. Examples of the type of information that may be incorporated in the call/bridge details may include, but is not limited to, bridge identifier 2740, call status 2750, bridge status 2760, call participant, passcode, and/or the like.

With the call thus identified, the bridge coordinator determines if two or more calls are accessing the same communication session (block 2810). According to some embodiments, this may be done by verifying and matching the passcodes provided by the participants as previously described. If two or more calls are not attempting to access the same communication session (block 2810), the bridge coordinator waits for call details from another bridge (block 2780). In contrast, where the bridge coordinator determines that two or more calls are attempting to access the same communication session (block 2810), the bridge coordinator determines if the bridge which received the call should be the host bridge (block 2770). According to some embodiments of the present invention, a determination that two or more calls acre accessing is done by checking the passcode associated with the calls. If the passcode is a host passcode then the bridge may be a host bridge. Where it is determined that the bridge is not a host bridge (block 2770), the bridge coordinator waits at block 2780 for call details from another bridge.

If the bridge coordinator determines that the bridge is a host bridge (block 2770), the bridge coordinator determines if the bridge has the capacity to accept the current communication session (block 2820). According to some embodiments of the present invention, this may be done by polling the bridge to query capacity. In response, the bridge may indicate a utilization level that may in turn be compared with a predetermined capacity threshold. Thus, for example, it may be determined whether the bridge is more than eighty percent utilized. In other embodiments of the present invention, the capacity of the bridge is transmitted to the bridge coordinator along with the call/bridge information. This information may be maintained in a table that is accessed whenever a determination of capacity is to be made. In either case, the bridge coordinator may estimate the bandwidth needed for the communication session based at least in part on the call information provided by the bridge and then determine if the bridge has sufficient capacity.

If the bridge is found to have sufficient capacity (block 2820), then the bridge coordinator determines if routing the call through the identified bridge would satisfy a desired load balance (block 2825). This may include, for example, determining whether another possible bridge is underutilized in comparison to the identified bridge or whether the identified bridge is over-utilized in comparison with other available bridges. The intent of making such a determination is to assure that a general balance is maintained between available bridges. Thus, various load balancing algorithms known in the art may be utilized to first make the determination of an allowable load balance and/or of another choice of bridge that would satisfy the desired load balance.

Where it is determined that the identified bridge satisfies desired load balance conditions (block 2825), it is determined whether choice of the bridge is least cost routable (block 2830). Least cost routing may consider one or more factors including, but not limited to, financial costs, quality of service, available service levels, and/or the like. As one example, least cost routable may be simply the lowest financial cost for performing a communication session. Thus, for example, where one or more PSTNs (phone systems) is being used in relation to the communication session, it may be determined which of the PSTNs provides the most advantageous rate structure for the call. Where it is determined that the identified bridge offers least cost routing (block 2830), all calls associated with the communication session are routed via the identified host bridge (block 2790). A table may be maintained that provides rates based upon geography that may be accessed to perform the aforementioned least cost routing example.

Alternatively, where it is determined that the identified bridge does not have capacity (block 2820), selection of the identified bridge results in a substantial load imbalance (block 2825), or that selection of the identified bridge does not result in least cost routing (block 2830), then another bridge is identified through determining an alternate bridge that does have capacity (block 2840), does satisfy a desired load balance (block 2845), and in some cases provides for least cost routing (not shown). In such a case, all calls associated with the communication session are routed via the alternative host bridge (block 2850).

Figure 29:
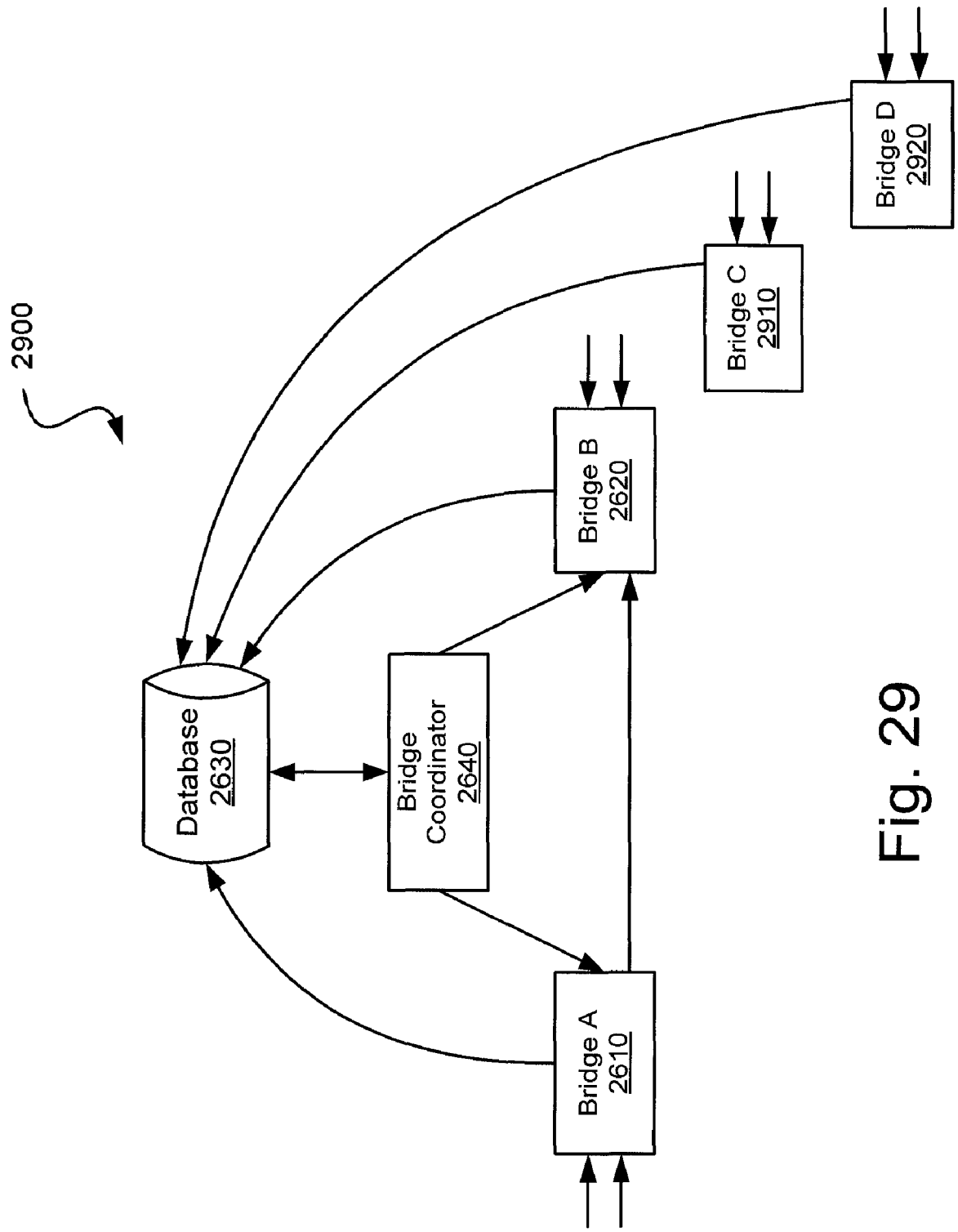
FIG. 29 illustrates another exemplary dynamically linked bridge formed using a bridge coordinator in accordance with various embodiments of the present invention.

FIG. 29 illustrates another exemplary dynamically linked bridge formed using a bridge coordinator in accordance with various embodiments of the present invention. FIG. 29 is similar to the logical diagram described with respect to FIG. 26, but where more than two bridges need to be connected. In addition to bridge A 2610 and bridge B 2620, one or more dial-in participants to a communication session have also accessed bridge C 2910 and bridge D 2920. As previously described bridge coordinator 2640 monitors the activity of all the bridges. Again, this may be done in a variety of ways. In one embodiment, bridge coordinator 2640 may wait for updates from each of the bridges. In other embodiments, bridge coordinator 2640 polls central database 2630 which contains information reported by the bridges. Still yet, in other embodiments, bridge coordinator 2640 polls the bridges independently. Then bridge coordinator 2640 determines how to route the call. For example, one embodiment of a method which bridge coordinator 2640 may use to decide how to route the call was described in FIG. 28.

Figure 30:
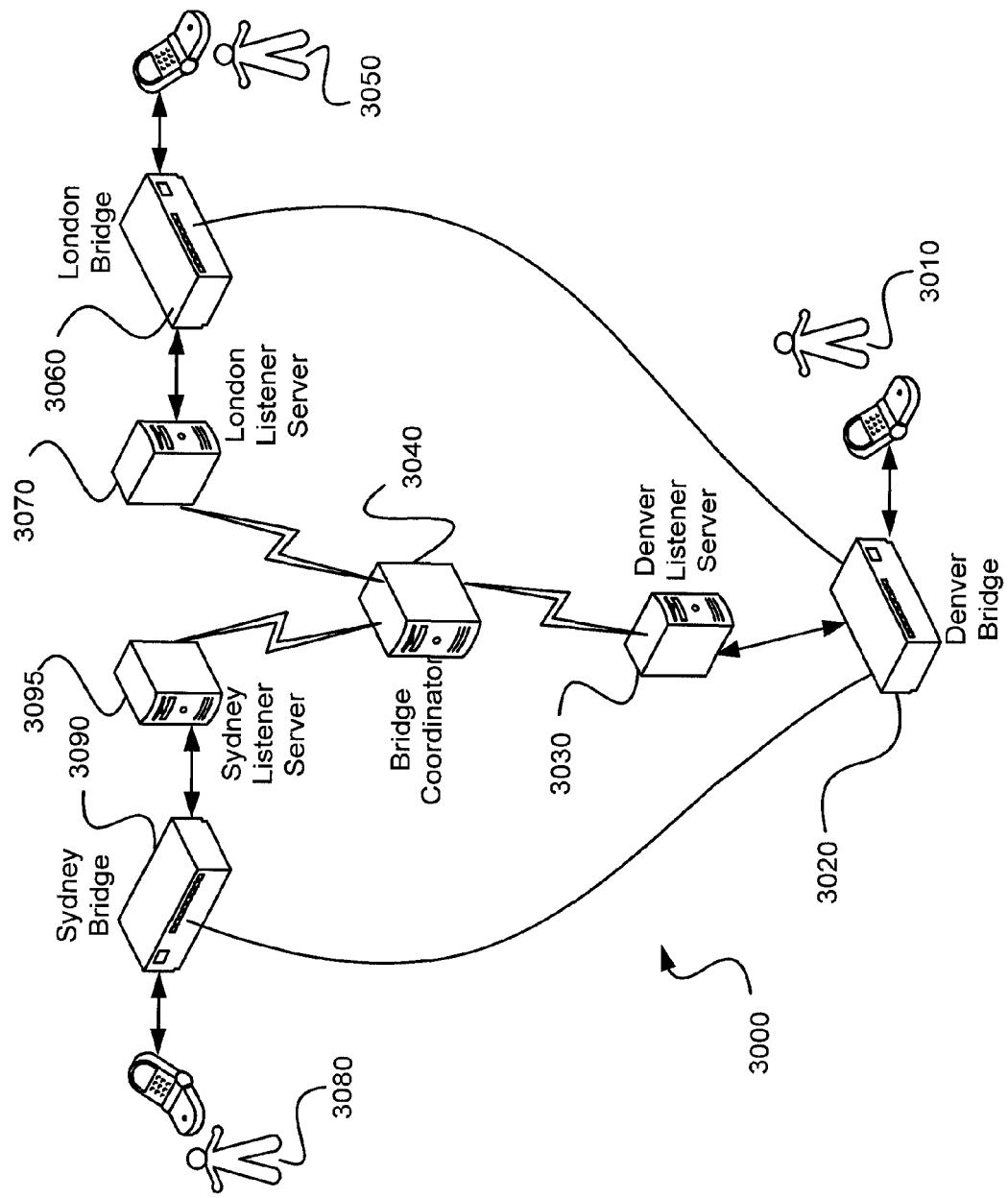
FIG. 30 provides a more particular example of dynamically linked bridges illustrating particular geographies and endpoints that may be serviced using systems and methods in accordance with one or more embodiments of the present invention.

FIG. 30 provides a more particular example of dynamically linked bridges illustrating particular geographies and endpoints that may be serviced using systems and methods in accordance with one or more embodiments of the present invention. In FIG. 30, participant 3010 dials into Denver bridge 3020. The bridge answers and prompts the participant to enter a communication session passcode. Participant 3010 enters a host passcode, which in this particular case is '1234'. Denver listener server 3030 receives information about the conference call and the participants using Denver bridge 3020. According to some embodiments of the present invention, listener server 3030 comprises listener software which is configured to make a TCP connection to a maintenance operating terminal (MAT) associated with Denver bridge 3020. According to various embodiments, the MAT may provide one or more of the following: telephony line setup and control, system feature configuration, logging and troubleshooting, and/or the like. The listener server software may be further configured to exchange messages with the MAT. One example of messages exchanged includes passcode validation messages. As such, when a participant's passcode is verified, a valid messages may be sent from the listener server to the Denver bridge 3020. According to one embodiment, a copy of the verification messages are also sent to bridge coordinator 3040. At this point a message may also be sent to a central database indicating that a participant has activated a conference on Denver bridge 3010. In some instances, MAT software may be commercially available. For example, one such example of commercially available MAT software may be purchased through Compunetix, Inc.

Then, in the exemplary situation depicted, participant 3050 dials into London bridge 3060 using a guest passcode, which in this particular case is '23456'. An entry may then be made in the central database indicating that a guest intended for the '12345' conference has dialed in to London bridge 3060. At this point, Denver bridge 3010 receives instructions from bridge coordinator 3040 to initiate a dial-out call to London bridge 3060. Then, the system joins all the participants. This process is repeated for the third participant 3080 who dials into Sydney bridge 3090 with associated Sydney listening server 3095.

In some embodiments, a listener server may be installed with software that will detect any loss of communication with either the database or bridge. Listener server may then begin a resynchronization process once the failed component regains complete functionality. During this resynchronization process, listener server 3030 will re-poll the bridges (MATS) and re-request all the information regarding active ports.

Figure 31:
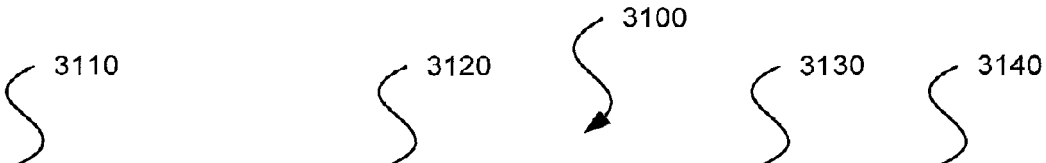
FIG. 31 illustrates an exemplary table which may be used in accordance with some embodiments of the present invention.

FIG. 31 illustrates an exemplary presence table which may be used in accordance with one embodiment of the present invention. Presence table 3100 provides a system for tracking the active participants on all of the bridges. In the embodiment depicted, presence table 3100 includes a bridge id 3110, a date and time 3120 the conference was initiated, passcode 3130, and port number 3140 on the bridge to which the participants are connected. According to one embodiment, a bridge coordinator may use this table to determine the location of all participants of a call regardless of the participant's location.

Figure 32:
FIG. 32 illustrates an exemplary table containing PSTN dial-out numbers which may be used in accordance with various embodiments of the present invention.

FIG. 32 illustrates an exemplary table containing PSTN dial-out numbers which may be used in accordance with one embodiment of the present invention. When initiating a dial-out call, the bridge coordinator will need to know what number to dial. According to one embodiment, in a PSTN configuration, the bridge coordinator may access a table, such as table 3200, which contains the appropriate number to dial by querying the database for the dial string from the originating bridge to the destination bridge.

FIG. 33 illustrates an exemplary table containing IP dial-string which may be used in accordance with one embodiment of the present invention. Similar to the PSTN table illustrated in FIG. 32, an IP table, such as table 3300, may be used when the call is being routed over an IP connection. In this instance, the bridge coordinator will query a database for the IP address of the bridge to dial. In some embodiments, additional information may also be provided including the port number, codec to use, IP header prefix, and the like.

Although the present invention has been described in connection with bridges that are connected to telephones, those skilled in the art will recognize that the present invention can be used in connection with a bridge suitable for video conferencing without departing from the scope and spirit of the present invention.

Figure 34:
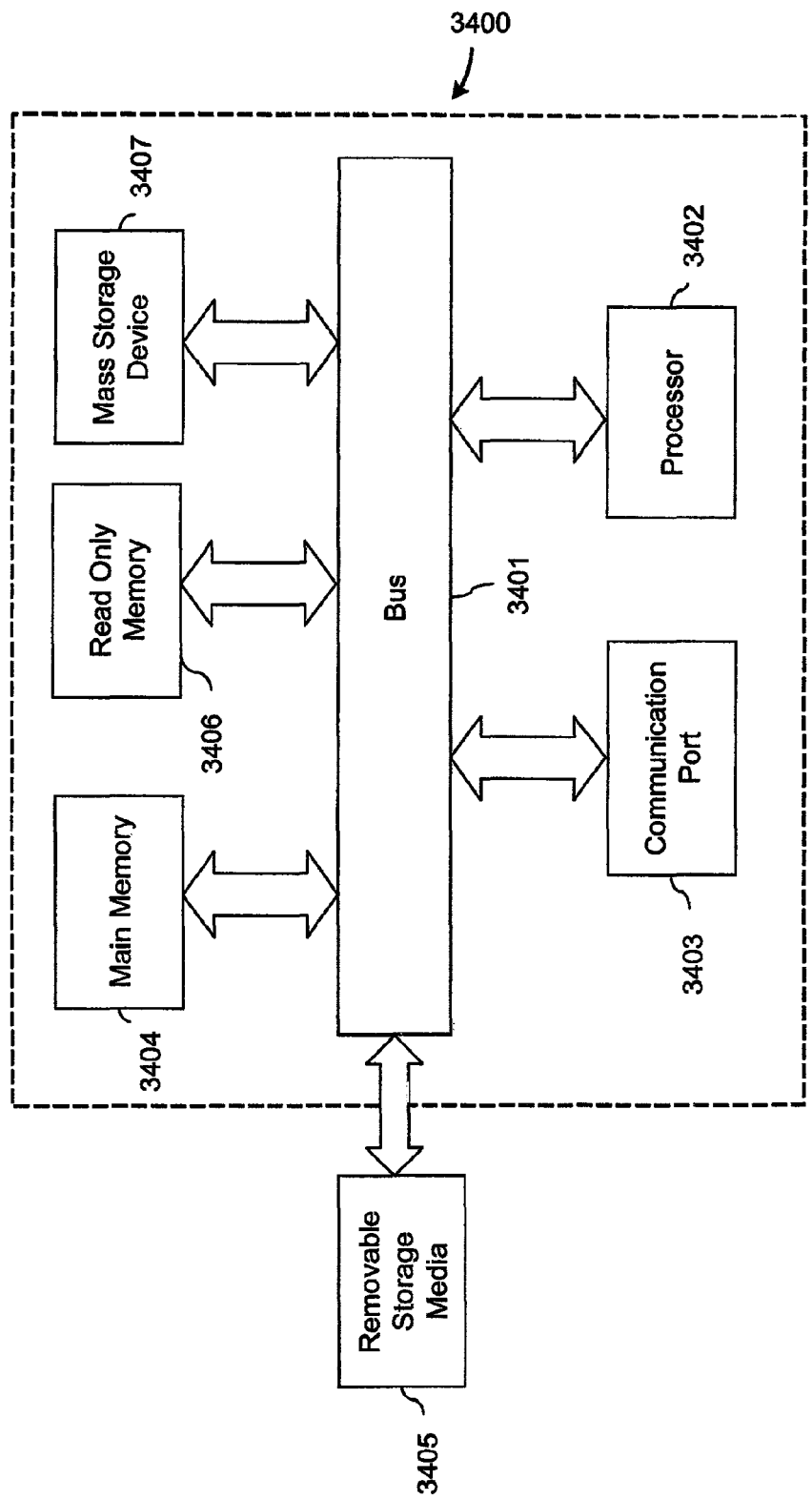
FIG. 34 is an example of a computer system that may be utilized in relation to one or more embodiments of the present invention.

Embodiments of the present invention include various steps, which have been described in detail above. A variety of these steps may be performed by hardware components or may be embodied in computer executable instructions, which may be used to cause a general-purpose or special-purpose processor programmed with the instructions to perform the steps. Alternatively, the steps may be performed by a combination of hardware, software, and/or firmware. As such, FIG. 34 is an example of a computer system 3400 with which embodiments of the present invention may be utilized. Such a computer system may include, but is neither limited to or required to include, a bus 3401, at least one processor 3402, at least one communication port 3403, a main memory 3404, a removable storage media 3405 a read only memory 3406, and a mass storage 3407.

Processor(s) 3402 can be any know processor, such as, but not limited to, an Intel® Itanium® or Itanium 2® processor(s), or AMD® Opteron® or Athlon MP® processor(s), Motorola® lines of processors, a Digital Signal Processor (DSP), and/or the like. Communication port(s) 3403 can be any of an RS-232 port for use with a modem based dialup connection, a 10/100 Ethernet port, or a Gigabit port using copper or fiber. Communication port(s) 3403 may be chosen depending on a network such a Local Area Network (LAN), Wide Area Network (WAN), or any network to which the computer system 3400 connects.

Main memory 3404 can be Random Access Memory (RAM), or any other dynamic storage device(s) commonly known in the art. Read only memory 3406 can be any static storage device(s) such as Programmable Read Only Memory (PROM) chips for storing static information such as instructions for processor 3402. Mass storage 3407 can be used to store information and instructions. For example, hard disks such as the Adaptec® family of SCSI drives, an optical disc, an array of disks such as RAID, such as the Adaptec family of RAID drives, or any other mass storage devices may be used. Bus 3401 communicatively couples processor(s) 3402 with the other memory, storage and communication blocks. Bus 3401 can be a PCI/PCI-X or SCSI based system bus depending on the storage devices used. Removable storage media 3405 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). The components described above are meant to exemplify some types of possibilities. In no way should the aforementioned examples limit the scope of the invention, as they are only exemplary embodiments.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for interconnecting real-time communication links, the method comprising:
    receiving a first status associated with a first communication link between a first endpoint and a first bridge in a network, wherein the first status indicates that the first communication link is established;

receiving a second status associated with a second communication link between a second endpoint and a second bridge in the network, wherein the second status indicates that the second communication link is established;

selecting one of the first bridge and the second bridge to operate as a host bridge, the selecting based at least in part on the first status and the second status; and after receiving both the first status and the second status, automatically causing a third communication link to be established between the selected host bridge and the non-selected one of the first bridge and the second bridge, wherein the third communication link is usable by the host bridge to interconnect a multi-party communication between at least the first endpoint and the second endpoint through the first bridge and the second bridge.

2. The method of claim 1, wherein the selecting the host bridge includes consideration of whether the first status indicates a host status, and whether the second status indicates the host status.

3. The method of claim 1, wherein the selecting the host bridge includes consideration of whether the first bridge has sufficient available capacity.

4. The method of claim 3, wherein the selecting the host bridge includes consideration of whether the second bridge has sufficient available capacity.

5. The method of claim 1, wherein the selecting the host bridge is based at least in part on the determination of whether one of the first bridge and the second bridge is least cost routable.

6. The method of claim 1, the method further comprising: recording a first entry in a database table, wherein the first entry includes a first plurality of call parameters related to the first communication link; and recording a second entry in the database table, wherein the second entry includes a second plurality of call parameters related to the second communication link.

7. The method of claim 6, wherein the first plurality of call parameters includes at least one parameter selected from a group consisting of: a bridge identifier, a call status, a port number, a conference passcode, and a bridge status.

8. The method of claim 6, wherein the first status associated with the first communication link is received by polling the database table.

9. The method of claim 1, wherein the automatically causing the host bridge to initiate a third communication link includes monitoring a database populated with a plurality of communication link status information to identify when the first communication link and the second communication link have been established.

10. The method of claim 1, wherein the causing the third communication link to be established comprises:
determining an access property of the non-host bridge;
communicating with the non-host bridge using the access property; and
transmitting a validation code from the non-host bridge to the host bridge.

11. The method of claim 10, wherein the validation code is a guest passcode.

12. A tangible computer-readable storage medium, not consisting of a propagated data signal, containing a set of instructions capable of causing one or more processors to:

receive a first status associated with a first communication link between a first endpoint and a first bridge in a network, wherein the first status indicates that the first communication link is established;

receive a second status associated with a second communication link between a second endpoint and a second bridge in the network, wherein the second status indicates that the second communication link is established;

select one of the first bridge and the second bridge to operate as a host bridge, wherein the selection is based at least in part on the first status and the second status; and cause a third communication link to be established between the host bridge and the non-selected one of the first bridge and the second bridge after receiving both the first status and the second status, wherein the third communication link is usable by the host bridge to interconnect a multi-party communication between at least the first endpoint and the second endpoint through the first bridge and the second bridge.

13. A method for interconnecting real-time communication links, the method comprising:

receiving a first status associated with a first communication link between a first endpoint and a first bridge in a network, wherein the first status indicates that the first communication link is established, and wherein the first status includes information related to the first communication link;

receiving a second status associated with a second communication link between a second endpoint and a second bridge in the network, wherein the second status indicates that the second communication link is established, and wherein the second status includes information related to the second communication link;

determining a host bridge based at least in part on the first status; and causing the first bridge to be linked to the second bridge using a third communication link based at least in part on the first status and the second status, wherein the third communication link is usable by the host bridge to interconnect a multi-party communication ongoing between at least the first endpoint and the second endpoint through the first bridge and the second bridge.

14. The method of claim 13 further comprising:
determining that the second bridge is the host bridge based at least in part on the second status; receiving a third status associated with a fourth communication link, wherein the fourth communication link is established between a third endpoint and a third bridge in the network; and
causing the fourth communication link to be linked to the first communication link and the second communication link by causing a fifth communication link to be established between the host bridge and the third bridge.

15. The method of claim 13, wherein the first status includes at least one parameter selected from a group consisting of: a bridge identifier, a call status, a port number, a conference passcode, and a bridge status.

16. The method of claim 13, wherein the determining the host bridge based at least in part on the first status includes determining if a call passcode associated with the first communication link was a host passcode or a guest passcode.

* * * * *